US008784562B2

(12) United States Patent
Imanishi et al.

(10) Patent No.: US 8,784,562 B2
(45) Date of Patent: Jul. 22, 2014

(54) CARBON NANOTUBE PRODUCTION PROCESS AND CARBON NANOTUBE PRODUCTION APPARATUS

(75) Inventors: Masahiro Imanishi, Gotemba (JP); Naoki Ito, Yokohama (JP); Shigeaki Murata, Numazu (JP); Keisuke Nagasaka, Susono (JP); Hiroyuki Kawai, Susono (JP); Satoshi Nakazawa, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 36 days.

(21) Appl. No.: 13/263,405

(22) PCT Filed: Apr. 8, 2010

(86) PCT No.: PCT/IB2010/000770
§ 371 (c)(1),
(2), (4) Date: Nov. 2, 2011

(87) PCT Pub. No.: WO2010/116238
PCT Pub. Date: Oct. 14, 2010

(65) Prior Publication Data
US 2012/0045572 A1 Feb. 23, 2012

(30) Foreign Application Priority Data
Apr. 9, 2009 (JP) .................................. 2009-095096

(51) Int. Cl.
C23C 16/26 (2006.01)
C23C 16/455 (2006.01)
B82Y 40/00 (2011.01)

(52) U.S. Cl.
USPC ........... 118/715; 118/724; 429/480; 429/490; 429/492

(58) Field of Classification Search
None
See application file for complete search history.

(56) References Cited

U.S. PATENT DOCUMENTS 3,730,696 A * 5/1973 Pointu et al. .................. 65/30.14
4,391,787 A * 7/1983 Tibbetts ....................... 423/447.3
(Continued)

FOREIGN PATENT DOCUMENTS

EP 1 553 052 A2 7/2005
JP 08-100328 A 4/1996
(Continued)

OTHER PUBLICATIONS

A. Lanz et al., "Hydrogen Fuel Cell Engines and Related Technologies: Module 4 Fuel Cell Technology," Energy Technology Training Center College of the Desert, Palm Desert, CA, US (2001) pp. 4-1 through 4-53 http://www1.eere.energy.gov/hydrogenandfuelcells/tech_validation/pdfs/fcm04r0.pdf.*

(Continued)

Primary Examiner — Jeffrie R Lund
Assistant Examiner — Stanislav Antolin
(74) Attorney, Agent, or Firm — Sughrue Mion, PLLC

(57) ABSTRACT

A substrate 10 that selectively allows hydrogen to permeate therethrough is formed with a catalyst thin layer 20 on a first side 11 thereof and is heated in a furnace tube 110, which functions as a reactor, of a heating furnace 100 while a raw material gas to the catalyst thin layer 20 is fed. Hydrogen produced on the first side 11 of the substrate 10 as a result of the formation of carbon nanotubes 5 is separated from the raw material gas and is allowed to permeate to a second side 12 thereof.

4 Claims, 23 Drawing Sheets

(56) References Cited

U.S. PATENT DOCUMENTS

| | | | |
|---|---|---|---|
| 4,855,091 A * | 8/1989 | Geus et al. | 264/437 |
| 6,806,397 B1 * | 10/2004 | Reilly | 585/446 |
| 6,875,417 B1 | 4/2005 | Shah et al. | |
| 7,192,567 B1 * | 3/2007 | Reilly | 423/447.1 |
| 2002/0031695 A1 * | 3/2002 | Smotkin | 429/30 |
| 2002/0100216 A1 * | 8/2002 | Colombani et al. | 48/197 R |
| 2002/0142206 A1 * | 10/2002 | Hinokuma | 429/33 |
| 2003/0116443 A1 * | 6/2003 | Maruyama et al. | 205/637 |
| 2004/0134770 A1 * | 7/2004 | Petersen | 204/192.38 |
| 2004/0211679 A1 * | 10/2004 | Wong et al. | 205/765 |
| 2006/0257704 A1 | 11/2006 | Ogino et al. | |
| 2007/0048210 A1 * | 3/2007 | Reilly | 423/447.3 |
| 2007/0215520 A1 * | 9/2007 | Edwin et al. | 208/46 |
| 2008/0263954 A1 | 10/2008 | Hammel et al. | |
| 2009/0041947 A1 * | 2/2009 | Morita | 427/532 |

FOREIGN PATENT DOCUMENTS

| | | | |
|---|---|---|---|
| JP | 2002-180252 A | | 6/2002 |
| JP | 2003-171108 A | | 6/2003 |
| JP | 2003-277031 A | | 10/2003 |
| JP | 2005-330175 A | | 12/2005 |
| JP | 2006-027947 A | | 2/2006 |
| JP | 2006-055698 A | | 3/2006 |
| JP | 2006-232607 A | | 9/2006 |
| WO | WO 9943609 A1 | * | 9/1999 |
| WO | WO 0021878 A1 | * | 4/2000 |
| WO | WO 2007053531 A2 | * | 5/2007 |
| WO | WO 2008113892 A1 | * | 9/2008 |
| WO | WO 2009038753 A1 | * | 3/2009 |
| WO | WO 2009139852 A1 | * | 11/2009 |

OTHER PUBLICATIONS

International Search Report and Written Opinion for corresponding International Patent Application No. PCT/IB2010/00770 mailed Jan. 26, 2011.

* cited by examiner

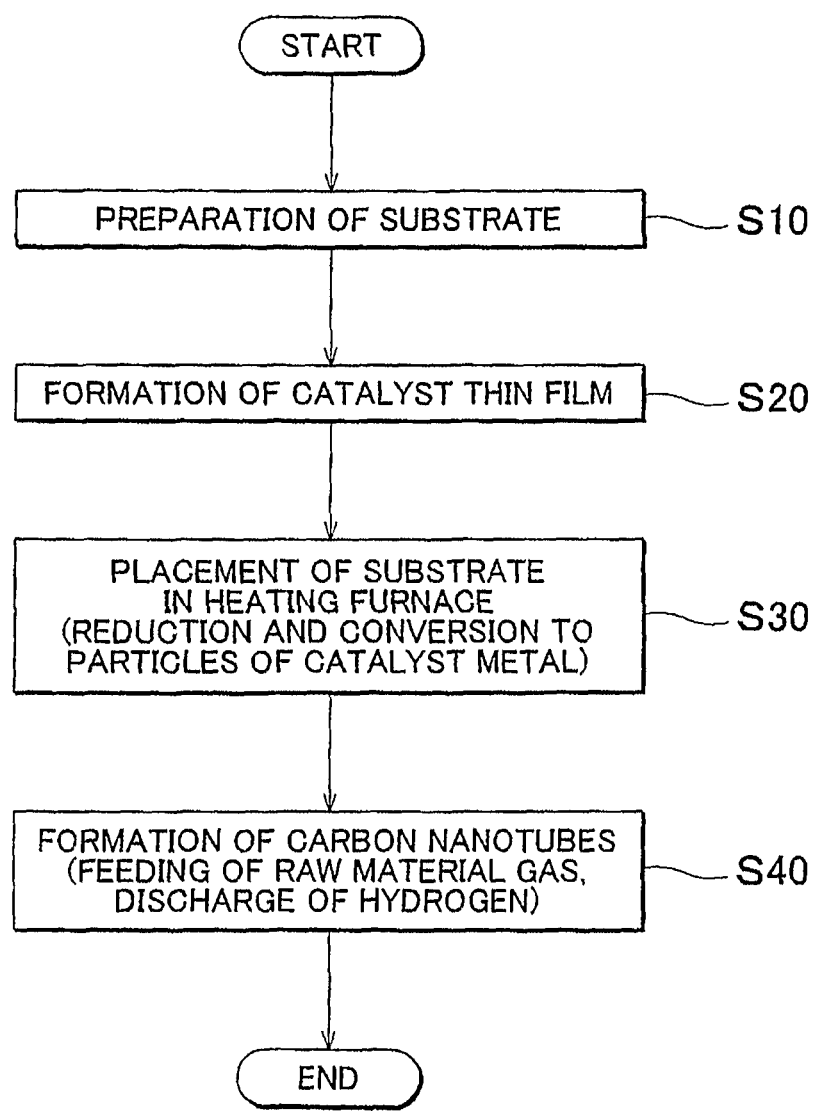

FIRST EMBODIMENT

FIRST EMBODIMENT

FIRST EMBODIMENT

FIG.4

| RAW MATERIAL GAS | MOLECULAR WEIGHT $M_A$ | MOLECULAR WEIGHT OF HYDROGEN $M_B$ | RATE OF INCREASE IN FORMABLE LIMIT LENGTH OF CARBON NANOTUBES $1+(M_B/M_A)^{1/2}$ |
|---|---|---|---|
| METHANE | 16 | 2 | 1.35 |
| ACETYLENE | 26 | 2 | 1.28 |
| ETHANOL | 46 | 2 | 1.21 |

FIG. 5A
SECOND EMBODIMENT
FIG. 5B
SECOND EMBODIMENT
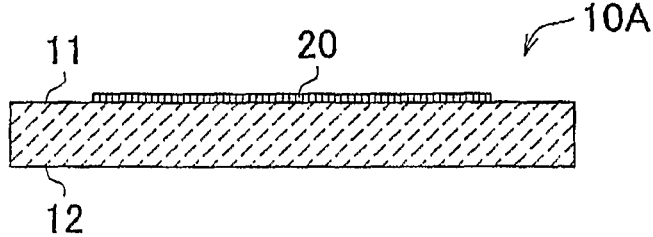
FIG. 5C
SECOND EMBODIMENT
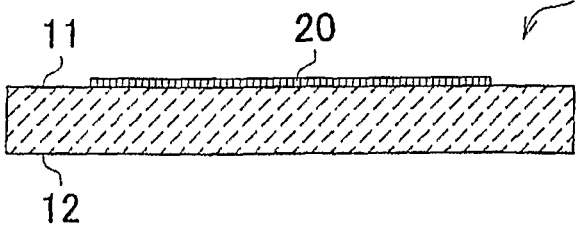
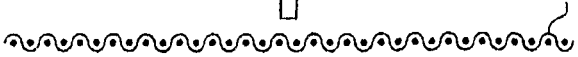

SECOND EMBODIMENT

SECOND EMBODIMENT

THIRD EMBODIMENT

THIRD EMBODIMENT

FOURTH EMBODIMENT

FOURTH EMBODIMENT

FOURTH EMBODIMENT

FIFTH EMBODIMENT

FIFTH EMBODIMENT

SIXTH EMBODIMENT

SIXTH EMBODIMENT

SIXTH EMBODIMENT

SIXTH EMBODIMENT (SECOND CONFIGURATION EXAMPLE)

SEVENTH EMBODIMENT

SEVENTH EMBODIMENT

SEVENTH EMBODIMENT

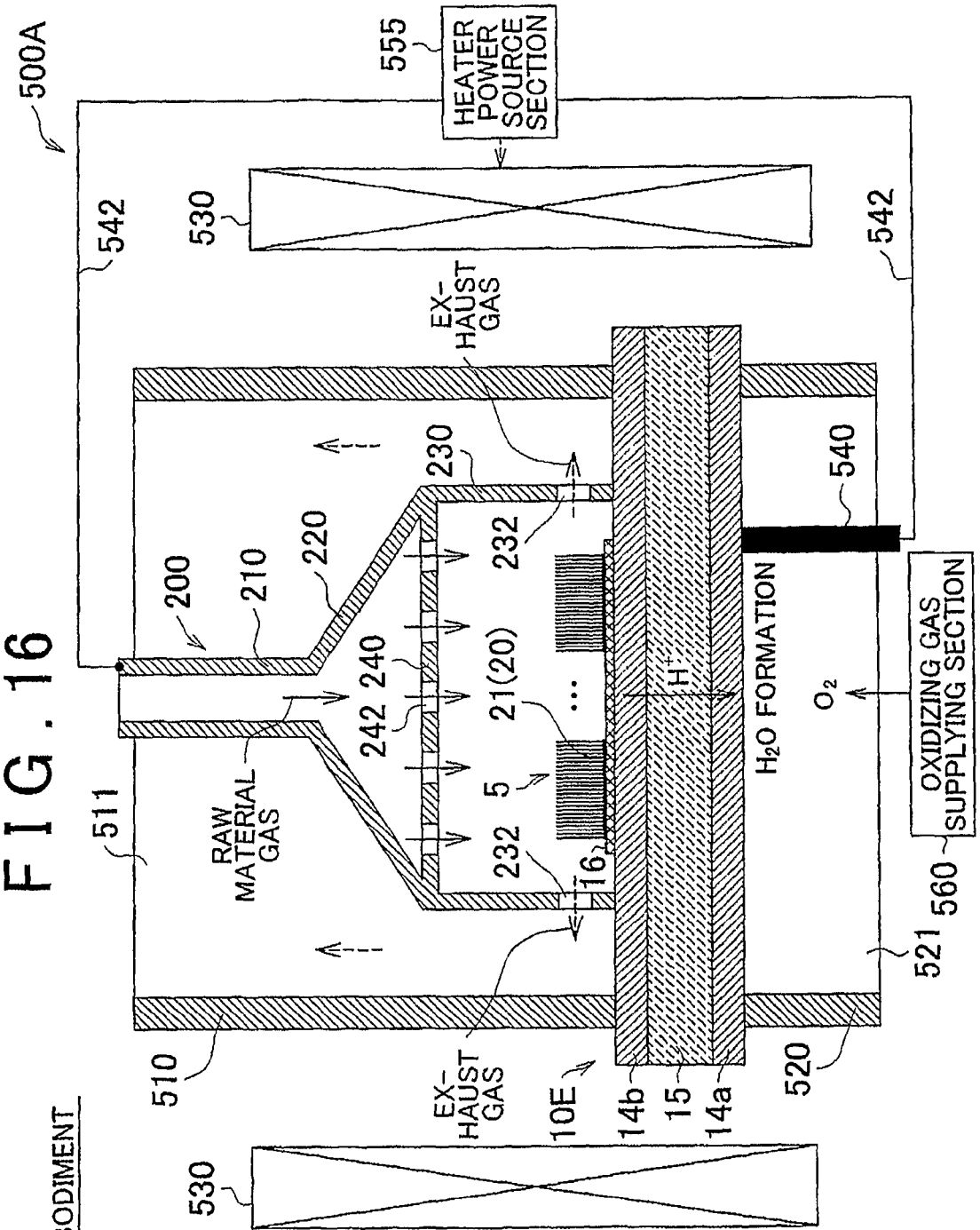

NINTH EMBODIMENT

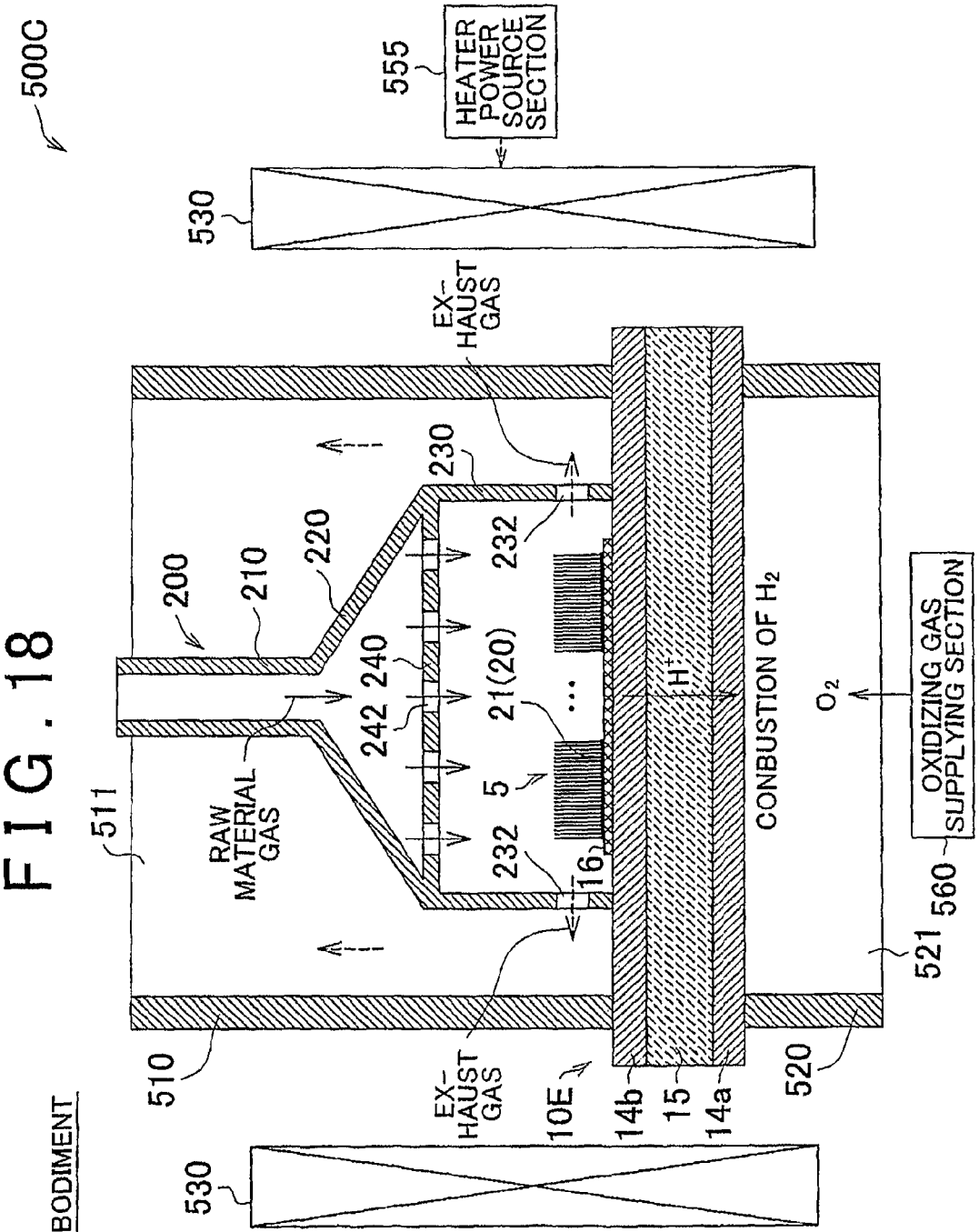

CARBON NANOTUBE PRODUCTION PROCESS AND CARBON NANOTUBE PRODUCTION APPARATUS

BACKGROUND OF THE INVENTION

1. Field of the Invention

This invention relates to a technology for producing carbon nanotubes.

2. Description of the Related Art

Japanese Patent Application Publications No. 2003-171108 (JP-A-2003-171108), No. 2006-27947 (JP-A-2006-27947) and No. 2003-277031 (JP-A-2003-277031) disclose a chemical vapor deposition method (CVD method) as a process for producing carbon nanotubes. In the CVD method, a silicon substrate having an outer surface supporting a catalytic metal such as iron (Fe) is placed in a furnace. After the furnace has been heated to a high temperature of about 800° C., a raw material gas such as a hydrocarbon is fed to the substrate so that carbon atoms from the thermal decomposition of the raw material gas are produced and arranged in a tubular form. A multiplicity of carbon nanotubes are then grown upwards from the substrate surface on which the catalyst is supported.

In general, there is a limitation to the length of carbon nanotubes that can be formed on a substrate by the CVD method (hereinafter such a limitation in length will be referred to as "formable limit length of carbon nanotubes"). Spun fibers of carbon nanotubes are manufactured by twisting carbon nanotubes grown up to their formable limit length. However, the obtained carbon nanotube spun fibers may cause a reduction of strength in portions at which individual carbon nanotubes are joined. Thus, there has been a demand for production of carbon nanotubes that have greater formable limit length to increase the strength of spun fibers of carbon nanotubes so far.

SUMMARY OF THE INVENTION

The present invention provides a technology that can increase the formable limit length of carbon nanotubes in a chemical vapor deposition process.

A first aspect of the present invention pertains to a carbon nanotube production process in which carbon nanotubes are grown by a chemical vapor deposition method. The production process includes: providing a substrate that allows hydrogen to permeate therethrough; supporting a catalyst on a first side of the substrate, in which the catalyst promotes a forming reaction of a carbon nanotube; feeding a raw material gas that contains carbon atoms and hydrogen atoms to the first side to grow the carbon nanotube; and permeating hydrogen that is produced on the first side by the forming reaction of the carbon nanotube to a second side that is opposite the first side. According to the above-described constitution, because the hydrogen that is produced together with the carbon nanotubes by the chemical vapor deposition method is separated from the raw material gas and is permeated from the first side of the substrate to the second side thereof, the concentration of the raw material gas at root portions of the carbon nanotubes is prevented from decreasing so that the formable limit length of the carbon nanotubes can be increased.

In the production process according to the present aspect, the substrate may be made of a proton conductive ceramics. According to the above-described, constitution, it is possible to separate by-product hydrogen from the raw material gas and to discharge the hydrogen from the reaction sites through the substrate that is made of proton conductive ceramics.

In the production process according to the present aspect, the substrate may be made of a porous ceramics that permeates hydrogen. According to the above-described constitution, it is possible to separate by-product hydrogen from the raw material gas and to discharge the hydrogen from the reaction sites through the substrate that is made of porous ceramics.

In the production process according to the present aspect, the substrate may be made of a hydrogen permeable metal. According to the above-described, constitution, it is possible to separate by-product hydrogen from the raw material gas and to discharge the hydrogen from the reaction sites through the substrate that is made of a hydrogen permeable metal.

In the production process according to the present aspect, the substrate may be made of a proton electron mixed conductor that conducts protons and electrons therein. According to the above-described constitution, it is possible to separate by-product hydrogen from the raw material gas and to discharge the hydrogen from the reaction sites through the substrate that is made of a proton electron mixed conductor.

In the production process according to the present aspect, the substrate may be made of a metal-ceramics mixture which includes proton conductive ceramics that are mixed with an electrically conductive metal material. According to the above-described constitution, it is possible to separate by-product hydrogen from the raw material gas and to discharge the hydrogen from the reaction sites through the substrate that is made of a metal-ceramics mixture.

In the production process according to the present aspect, the substrate may be provided with a hydrogen permeable electrode on each of the first and second sides and the permeating hydrogen may include impressing a voltage between the electrodes to induce protons to the second side. According to the above-described constitution, it is possible to induce by-product hydrogen to the second side according to the potential difference between the electrodes so that the hydrogen may be separated from the raw material gas and discharged from the reaction sites. Therefore, the discharge of hydrogen can be more efficiently achieved.

In the production process according to the present aspect, the substrate may be provided with a hydrogen permeable electrode on each of the first and second sides and the permeating hydrogen may include supplying oxygen from the second side of the substrate and collecting a current from the first and second sides of the substrate. According to the above-described constitution, the substrate can serve to function as a polymer electrolyte fuel cell in which electric power is generated using by-product hydrogen as a reaction gas.

In the production process according to the present aspect, the permeating hydrogen may include supplying oxygen from the second side of the substrate and combusting hydrogen in the second side. According to the above-described constitution, it is possible to utilize the heat, that is generated by combustion of hydrogen that has been transferred to the second side, for the carbon nanotube forming reaction that is an endothermic reaction. Therefore, the carbon nanotube forming efficiency can be improved.

In the production process according to the present aspect, the substrate may include an air permeable porous support that is located on the second side. According to the above-described constitution, it is possible to make thin the thickness of the film that is formed in the substrate and that selectively permeates hydrogen while ensuring the strength of the substrate by the porous support. Therefore, it is possible to improve the hydrogen permeation efficiency of the substrate.

In the production process according to the present aspect, the substrate may include a diffusion preventive layer that is located between the catalyst and the first side and that is configured to prevent the catalyst from diffusing to the inside of the substrate. According to the above-described constitution, it is possible to prevent the catalyst from diffusing into constituting components of the substrate, from alloying therewith and from being inactivated.

In the production process according to the present aspect, the permeating hydrogen may include making a hydrogen gas pressure on the second side of the substrate lower than that on the first side. According to the above-described constitution, it is possible to induce hydrogen from the first side to the second side of the substrate according to the pressure difference and to improve the hydrogen discharging efficiency.

In the production process according to the present aspect, the permeating hydrogen may include introducing a purge gas into the second side of the substrate to purge the hydrogen therefrom. According to the above-described constitution, it is possible to reduce the hydrogen partial pressure in the second side of the substrate by purging hydrogen gas with the purging gas and to induce hydrogen from the first side to the second side of the catalyst. It is, therefore, possible to improve the hydrogen discharging efficiency.

The production process according to the present aspect may further include recovering an unreacted raw material gas that is a portion of the raw material gas that has not undergone the forming reaction of the carbon nanotube, and recycling the recovered gas as the raw material gas. According to the above-described constitution, it is possible to efficiently utilize the raw material gas and to improve the carbon nanotube production efficiency.

In the production process according to the present aspect, the permeated hydrogen may be in the form of protons.

In the production process according to the present aspect, the substrate may be configured to allow hydrogen to selectively permeate therethrough, and the hydrogen that is produced on the first side may be selectively permeated to the second side, to be removed from the first side.

A second aspect of the present invention pertains to a carbon nanotube production apparatus by a chemical vapor deposition method. The production apparatus includes: a reactor that accommodates a substrate that has a first side on which a catalyst that promotes a forming reaction of a carbon nanotube is supported, the substrate being configured to allow hydrogen to permeate therethrough from the first side to a second side; a raw material gas feeding section that feeds a raw material gas that contains carbon atoms and hydrogen atoms to the first side; and a hydrogen removing section that permeates hydrogen, which is produced on the first side of the substrate by the forming reaction of the carbon nanotube, to the second side. According to the above-described constitution, the hydrogen that is produced on the first side of the substrate together with the carbon nanotubes may be permeated to the second side thereof and may be discharged from the reaction sites. Therefore, a decrease of the concentration of the raw material gas at the reaction cites due to formation of the hydrogen is prevented so that the formable limit length of the carbon nanotubes can be increased.

In the production apparatus according to the present aspect, the substrate may include first and second, hydrogen permeable electrode layers that are provided on the first and second sides, respectively, and a polymer electrolyte layer that has proton conductivity and is interposed between the first and second electrode layers. In this case, the hydrogen removing section may include an oxidizing gas supplying section that supplies an oxygen-containing oxidizing gas to the second side and may be configured to subject the hydrogen which has permeated from the first side to an electrochemical reaction with the oxidizing gas and to collect an electrical power that is generated by the electrochemical reaction. According to the above-described constitution, it is possible to remove the hydrogen from the first side of the substrate and, at the same time, to generate electric power on the substrate using the hydrogen together with the oxidizing gas that is supplied from the oxidizing gas supplying section as reaction gases. Therefore, the carbon nanotube production efficiency may be improved.

The production apparatus according to the present aspect may further include a raw material gas inducing member that induces the raw material gas to the first side of the substrate. The raw material gas inducing member may include an outer peripheral side wall that surrounds a catalytic region in the first side on which the catalyst is supported such that the raw material gas is induced to the catalytic region. The outer peripheral side wall may be provided with a discharge hole or holes through which an unreacted raw material gas is discharged to outside. The unreacted raw material gas is a portion of the raw material gas that has been induced to the catalytic region but that has not undergone forming reaction of the carbon nanotube. According to the above-described constitution which is provided with the raw material gas inducing member, it is possible to improve the efficiency of feeding the raw material gas and the efficiency of discharging the unreacted raw material gas-containing exhaust gas. Therefore, the carbon nanotube production efficiency may be improved.

In the production apparatus according to the present aspect, the permeated hydrogen may be in the form of protons.

In the production apparatus according to the present aspect, the substrate may be configured to allow hydrogen to selectively permeate therethrough, and the hydrogen that is produced on the first side may be selectively permeated to the second side, to be removed from the first side.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a flowchart that illustrates a procedure for the production of carbon nanotubes;

FIG. 4 is a table that shows calculation results for the rate of increase in length of carbon nanotubes that are produced while removing by-products;

FIGS. 5A, 5B and 5C are schematic diagrams that explain a procedure for the production of carbon nanotubes according to a second embodiment;

FIG. 16 is a schematic view that illustrates a carbon nanotube production apparatus according to an eighth embodiment;

FIG. 18 is a schematic view that illustrates a carbon nanotube production apparatus according to a tenth embodiment.

DETAILED DESCRIPTION OF EMBODIMENTS

Description is hereinafter made of embodiments of the present invention.

Figure 2A:
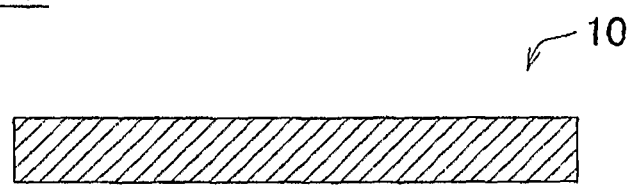
FIGS. 2A and 2B are schematic diagrams that explain procedure for the production of carbon nanotubes according to a first embodiment.
Figure 2B:
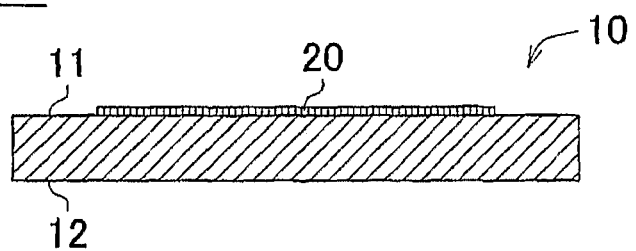

FIG. 1 is a flowchart that illustrates a procedure for the production of carbon nanotubes by CVD method as a first embodiment of the present invention. FIGS. 2A and 2B are schematic diagrams that explain first and second steps (steps S10 and S20 in FIG. 1), respectively. In the first step, a substrate 10 to support a catalyst is prepared (FIG. 2A). The substrate 10 is made of a porous ceramic film of aluminum oxide ($Al_2O_3$: which is also called "alumina") or silicon dioxide ($SiO_2$: which is also called "silica"). The substrate 10 may have a sufficient porosity to selectively allow hydrogen to permeate therethrough.

In the second step, a thin film of a catalyst metal such as iron (Fe) (which is hereinafter referred to as "catalyst thin film 20") is formed on an outer surface of the substrate 10 by sputtering (FIG. 2B). It should be noted that, as used in the present specification, the term "catalyst metal" hereinafter means a catalyst metal that promotes formation of carbon nanotubes. Also, as used in the present specification, the side of the substrate 10 on which the catalyst thin film 20 is formed is referred to as "first side 11", and the side that is opposite the first side 11 is referred to as "second side 12." Here, the catalyst metal that can be used to form the catalyst thin film 20 includes, in addition to iron, simple substances of transition metals such as cobalt (Co), nickel (Ni) and molybdenum (Mo), and alloys that contain two or more of these transition metals.

Figure 3A:
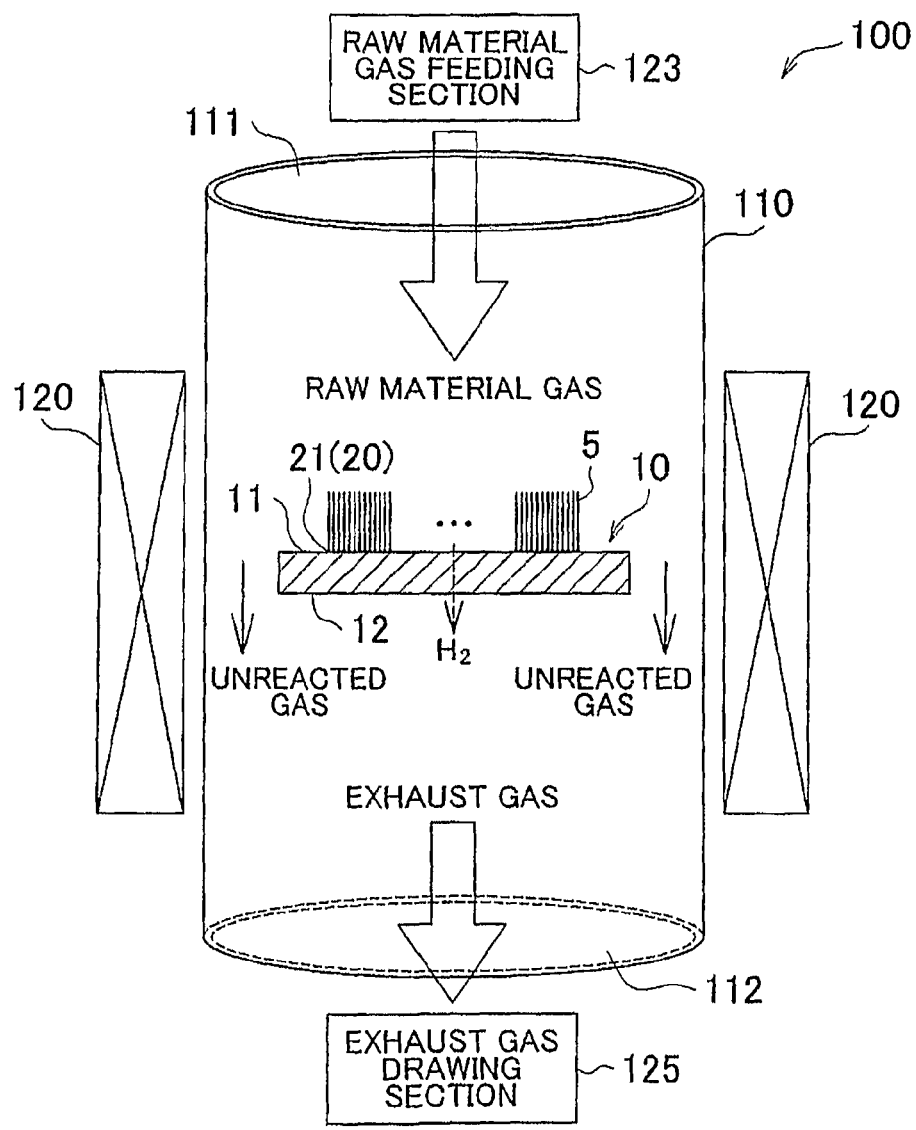
FIGS. 3A and 3B are schematic diagrams that explain a procedure for the production of carbon nanotubes according to the first embodiment.

FIG. 3A is a schematic view that schematically illustrates a heating furnace 100 that is used in third and fourth steps (steps S30 and S40 in FIG. 1). The heating furnace 100 has a furnace tubing 110, which is a hollow cylindrical reactor, a heater section 120, a raw material gas feeding section 123, and an exhaust gas drawing section 125. The heater section 120 is arranged to surround an outer periphery of the furnace tubing 110 and raises the temperature of the interior space of the furnace tubing 110. The raw material gas feeding section 123 is located on the side of a first opening 111 of the furnace tubing 110, and feeds a raw material gas into the interior space of the furnace tubing 110. The exhaust gas drawing section 125 is located on the side of a second opening 112 of the furnace tubing 110, and draws an exhaust gas that contains an unreacted gas, which has not undergone the carbon nanotube forming reaction, and by-products.

In the third step, the substrate 10, on which the catalyst thin film 20 has been formed, is placed in the interior space of the furnace tubing 110. More specifically, the substrate 10 is fixedly placed by a supporting section (not shown) such that the first side 11 is on the side of the first opening 111 and the second side 12 is on the side of the second opening 112. A space through which a gas can pass is defined between the substrate 10 and the interior wall surface of the furnace tubing 110. In addition, the temperature of the interior space of the furnace tubing 110 is raised and hydrogen is fed to the first side 11 of the substrate 10 in this third step. Thus, the catalyst metal that forms the catalyst thin film 20 is reduced and melted into particles. As a result of the first to third steps, the catalyst metal which has been converted into particles is supported on the substrate 10. The catalyst metal that has been converted into particles is hereinafter referred to as "catalyst particles 21."

In the fourth step, a hydrocarbon as a raw material gas is fed from the first opening 111 to the first side 11 of the substrate 10 while the inside of the furnace tubing 110 is maintained at an elevated temperature of approximately 600° C. to 900° C. (preferably approximately 800° C.) by the heater section 120. As the raw material gas, an aliphatic hydrocarbon such as methane ($CH_4$), acetylene ($C_2H_2$), ethane ($C_2H_6$), propane ($C_3H_8$), or butane ($C_4H_{10}$) may be also used. A cyclic hydrocarbon that has an aromatic ring (six-membered ring) such as benzene ($C_6H_6$), and a mixed gas that contains two or more of these hydrocarbon gases may be used. An alcohol such as ethanol (GAM may be used instead of a hydrocarbon as the raw material gas.

In addition, the exhaust gas drawing section 125 is operated to draw gases toward the second opening 112 of the furnace tubing 110 in this fourth step. Thus, unreacted gas that has not undergone the reaction is induced toward the second opening 112 through the space between the substrate 10 and the interior wall surface of the furnace tubing 110, and, at the same time, the hydrogen on the first side 11 of the substrate 10 is induced to the second side 12 to promote the remove of hydrogen from the side of the first side 11.

Figure 3B:
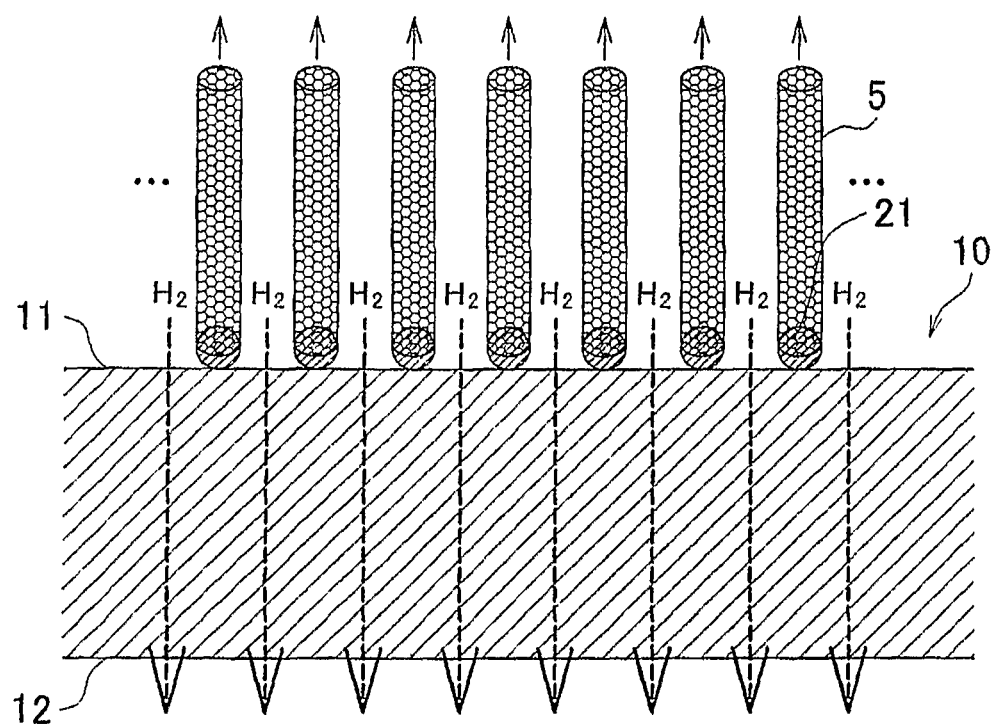

FIG. 3B is a schematic diagram that illustrates a part of the substrate 10 placed in the furnace tubing 110 in an enlarged scale. FIG. 3B schematically illustrate the manner in which carbon nanotubes 5 are growing from the catalyst particles 21 that are supported on the first side 11 of the substrate 10. When the raw material gas is supplied to the activated catalyst particles 21, carbon atoms from thermal decomposition of the raw material gas continuously form five-membered rings or six-membered rings on outer surfaces of the catalyst particles 21. As a result, carbon nanotubes 5 grow upward (in the direction indicated by solid line arrows in the drawing) on the first side 11 of the substrate 10 from the catalyst particles 21 as roots of carbon nanotubes.

In general, as carbon nanotubes grow and the lengths thereof increase, a concentration of a raw material gas at root portions (reaction cites) of the carbon nanotubes decreases; and carbon nanotubes eventually stop growing when the concentration of the raw material gas is considerably reduced (see J. Phys. Chem. C, Vol. 112, No. 13, 2008). In order to grow carbon nanotubes to longer lengths, therefore, it is necessary to prevent the concentration of a raw material gas (hereinafter referred to simply as "raw material gas concentration") at root portions of the carbon nanotubes from decreasing.

At the roots of the carbon nanotubes 5, hydrogen is produced as a by-product from the hydrogen atoms that are contained in the raw material gas with the growth of the carbon nanotubes 5. By reducing the concentration of the produced hydrogen, the concentration of the raw material gas can be prevented from decreasing so that the formable limit length of the carbon nanotubes 5 that will be formed can be increased. In addition, since formation of hydrogen from the raw material gas is promoted when the hydrogen concentration at the roots of the carbon nanotubes 5 is reduced, the rate of the reaction to form the carbon nanotubes 5 can be increased.

Here, the substrate 10 of this embodiment is made of porous ceramics that selectively allows hydrogen to permeate therethrough. Thus, the hydrogen that is present on the first side 11 of the substrate 10 can be separated from the raw material gas and allowed to permeate to the second side 12. This can prevent, a decrease in the raw material gas concentration due to formation of hydrogen in the reaction sites and increase the formable limit length of the carbon nanotubes 5.

A technology to produce porous ceramics which selectively allows hydrogen to permeate therethrough and which can be used for the substrate 10 is commonly proposed. For example, the porous ceramics that are disclosed in (1) Japanese Patent Application Publication No. 2002-128512 (JP-A-2002-128512) and (2) Japanese Patent Application Publication No. 8-38864 (JP-A-8-38864), which have pores that are fine enough to separate hydrogen from nitrogen gas, can sufficiently separate hydrogen from the raw material gas in this embodiment.

The substrate 10 may be made of, instead of the porous ceramics as described above, a hydrogen permeable metal foil. The hydrogen permeable metal foil may be made of a simple substance or alloy of palladium and a Group V metal such as vanadium (V), niobium (Ni), and tantalum (Ta). A multilayer film composed of a base layer of such an alloy and a Pd layer or a Pd alloy layer formed on at least one side of the base layer may be formed into the substrate 10. Even with such a constitution, the hydrogen that is formed on the first side 11 can be transferred to the second side 12 as in the case where the substrate 10 is made of porous ceramics.

FIG. 4 is a table that shows the rate of increase in formable limit length of carbon nanotubes that can be presumed from a description in the aforementioned article (J. Phys. Chem. C, Vol. 112, No. 13, 2008). The values of the rate shown in the table can be obtained by calculation as described below. According to the aforementioned article, the relationship between the raw material gas concentration C* and the length L of the carbon nanotubes that can be formed can be obtained as the following equations (1) and (2):

$$C^* = C0 \cdot (1/(\Phi+1)) \quad (1)$$

$$\Phi = (Ks/De) \cdot L \quad (2)$$

where C0 represents the concentration of the raw material gas that is supplied from the raw material gas feeding section 123, and Ks and De are coefficients. It should be noted that a decrease in the raw material gas concentration due to formation of a by-product is not taken into consideration in the equation (1).

In addition, in the aforementioned article, the relationship between the concentration C*B of the by-product in the reaction sites and the length of the carbon nanotubes that can be formed is given by the following equation (3):

$$C^*B = C0 \cdot (M_B/M_A)^{1/2} \cdot (\Phi/(\Phi+1)) \quad (3)$$

where $M_A$ represents the molecular weight of the raw material gas, and $M_B$ represents the molecular weight of the by-product.

Here, it is supposed that the coefficient Ks and De are both 1 to simplify the calculation. In this case, if C0=1, the value of F in the case where C*=0.1 (the aforementioned article) is equal to the formable limit length of the carbon nanotubes in the case where no by-product is produced. Thus, the formable limit length Lmax can be obtained by the following equation (4), using the above equations (1) and (2).

$$Lmax = \Phi = 9 \quad (4)$$

On the other hand, the value of F in the case where C*/(C0+C*B)=0.1 is equal to the formable limit length of carbon nanotubes in the case where a decrease in the raw material gas concentration due to formation of a by-product is taken into consideration. The formable limit length Lmax2 can be obtained by the following equation (5):

$$Lmax2 = Lmax/(1+(M_B/M_A)^{1/2}) \quad (5)$$

This indicates that the formable limit length of the carbon nanotubes that can be formed can be $1+(M_B/M_A)^{1/2}$ times greater by removing the by-product from the reaction sites. The results of calculation according to the above equation (5) in the cases where methane, acetylene and ethanol are supplied as the raw material gas and hydrogen as a by-product is removed are shown for each type of the raw material gas in the table of FIG. 4. As shown in the table, according to the production procedure of this embodiment, the formable limit length of carbon nanotubes can be increased to at least approximately 1.2 to 1.4 times.

As described above, according to the production procedure of this embodiment, the substrate 10, which selectively allows hydrogen to permeate therethrough, enables the carbon nanotubes 5 to grow on the first side 11 thereof and enables hydrogen as a by-product to be selectively induced to the second side 12. Therefore, the formable limit length of the carbon nanotubes 5 which are formed by CVD method can be increased.

FIGS. 5A to 5C are schematic diagrams that explain a procedure for the production of carbon nanotubes by CVD method as a second embodiment of the present invention. The production procedure of the second embodiment is the same as the production procedure of the first embodiment (FIG. 1) except for the differences that are described below. In the first step, a substrate 10A made of proton conductive ceramics is prepared (FIG. 5A). As the proton conductive ceramics, a BaZrO-based, BaCeO-based, SrZrO-based, or SrCeO-based proton conductor that is used as a polymer electrolyte in a polymer electrolyte fuel cell may be used.

In the second step, the catalyst thin film 20 is formed on an outer surface of the substrate 10A by sputtering (FIG. 5B). Then, the substrate 10A, on which the catalyst thin film 20 has been formed, is interposed between mesh-type first and second electrodes 31 and 32 (FIG. 5C). An electrically conductive path (not shown) is formed between the first and second electrodes 31 and 32.

Here, a catalyst that promotes protonation of hydrogen molecules (which is hereinafter referred to also as "protonating catalyst") may be supported on the first electrode 31. As the protonating catalyst, a catalyst material such as platinum, palladium, rhodium (Rh), ruthenium (Ru) or nickel may be used. A mixed material of such a catalyst material and an electrolyte may be used in the form of particles or a film. On the other hand, a catalyst that promotes return of protons to hydrogen molecules (which is hereinafter referred to also as "hydrogenating catalyst") may be supported on the second electrode 32. As the hydrogenating catalyst, the same catalyst material as the protonating catalyst may be used. The protonating catalyst and the hydrogenating catalyst may not be supported on the first and second electrodes 31 and 32, respectively, and may be directly supported on the first and second sides 11 and 12, respectively, of the substrate 10A, for example.

Figure 6A:
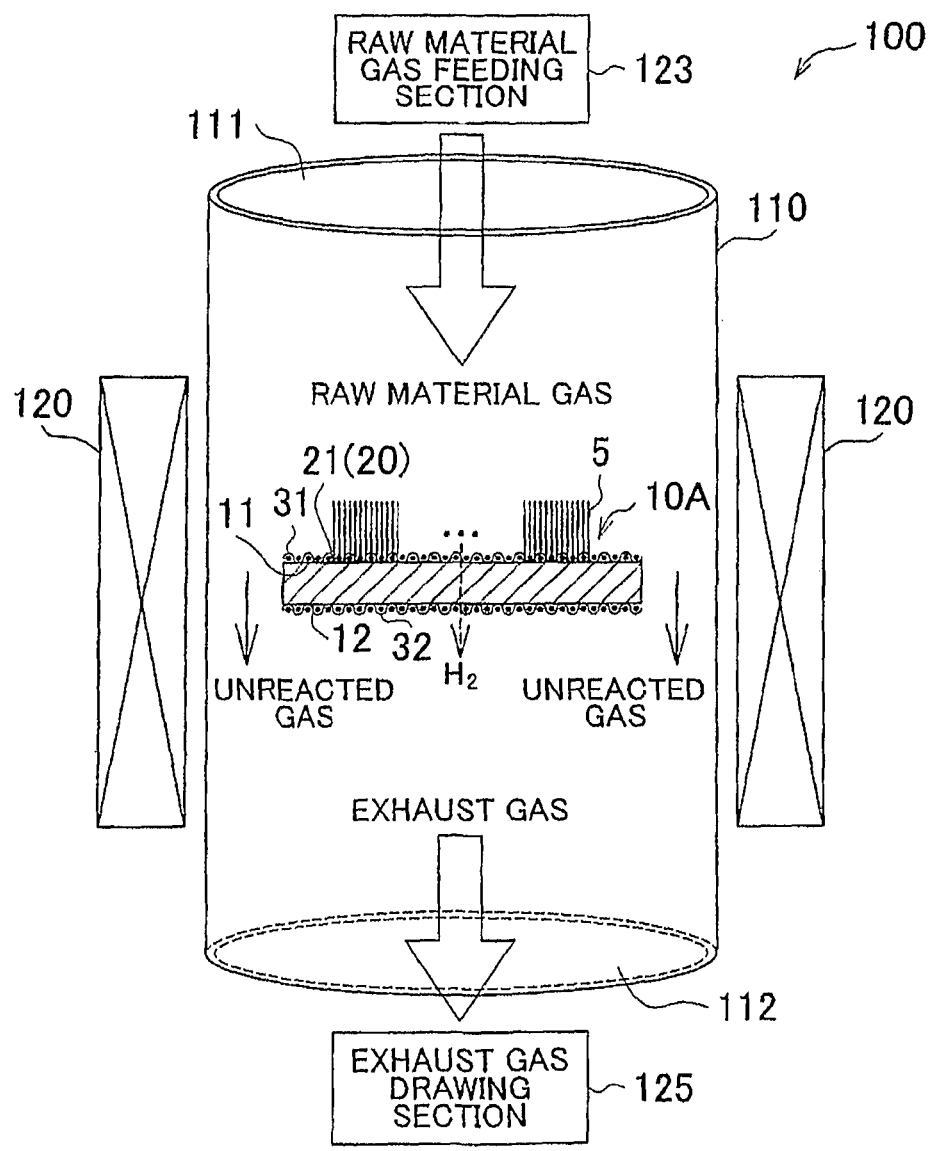
FIGS. 6A and 6B are schematic diagrams that explain a procedure for the production of carbon nanotubes according to the second embodiment.
Figure 6B:
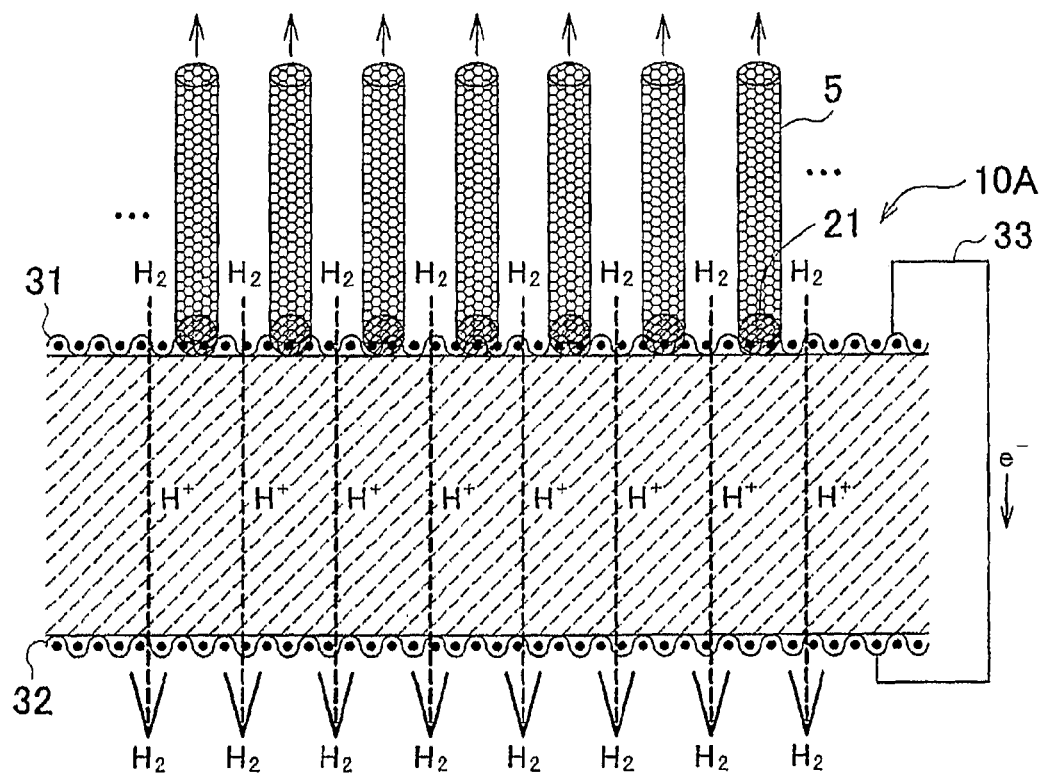

FIGS. 6A and 6B are schematic diagrams that explain third and fourth steps of the second embodiment. FIGS. 6A and 6B are generally the same as FIGS. 3A and 3B, respectively, except that the substrate 10A, on which the two electrodes 31 and 32 have been provided, is shown in place of the substrate 10. In the third step, the substrate 10A is placed in the furnace tubing 110 of the heating furnace 100. Then, the substrate 10A is heated to convert the catalyst metal that forms the catalyst thin film 20 into particles and disperse the particles, and hydrogen is fed to the substrate 10A to reduce the catalyst metal.

In the fourth step, the raw material gas is introduced toward the first side 11 of the substrate 10A with the temperature of the substrate 10A raised in the heating furnace 100. Then, the carbon nanotubes 5 grow upward from the catalyst particles 21 on the first side 11 through the mesh holes of the first and second electrodes 31 and 32. The hydrogen that is produced on the first side 11 with the formation of the carbon nanotubes 5 releases electrons and becomes protons, which are transferred in the substrate 10A to the second side 12. The electrons that have been released from the hydrogen flow from the first electrode 31 through the electrically conductive path 33 to the second electrode 32. On the second side 12 of the substrate 10A, the protons receive electrons from the second electrode 32 and return to hydrogen molecules. The hydrogen molecules are drawn by the exhaust gas drawing section 125 together with the raw material gas that has not undergone the reaction as in the first embodiment.

As described above, according to the production procedure of the second embodiment, the hydrogen that is produced with formation of the carbon nanotubes 5 can be separated from the raw material gas and transferred to the second side 12 through the substrate 10A, which has proton conductivity. Therefore, a decrease in the raw material gas concentration on the first side 11 of the substrate 10A can be prevented, and formation of longer carbon nanotubes 5 can be achieved.

Figure 7A:
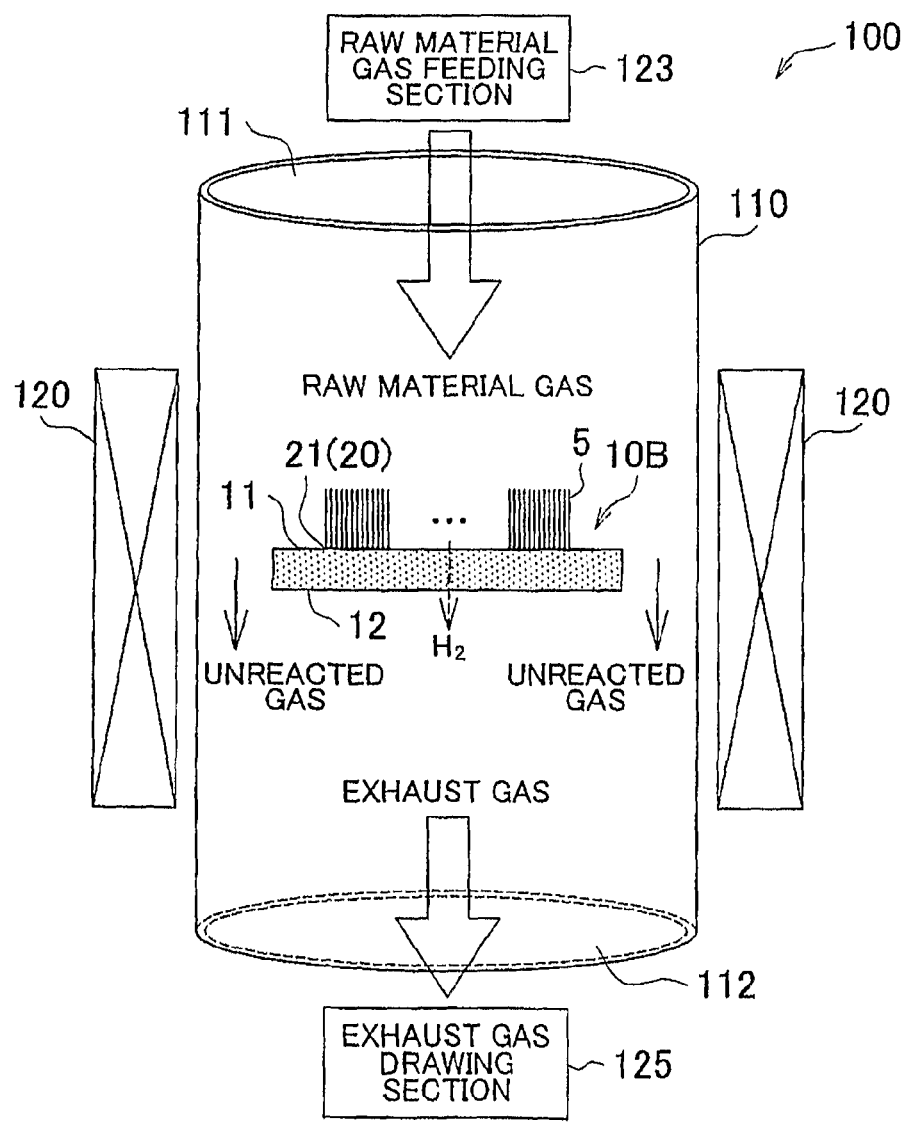
FIGS. 7A and 7B are schematic diagrams that explain a procedure for the production of carbon nanotubes according to a third embodiment.
Figure 7B:
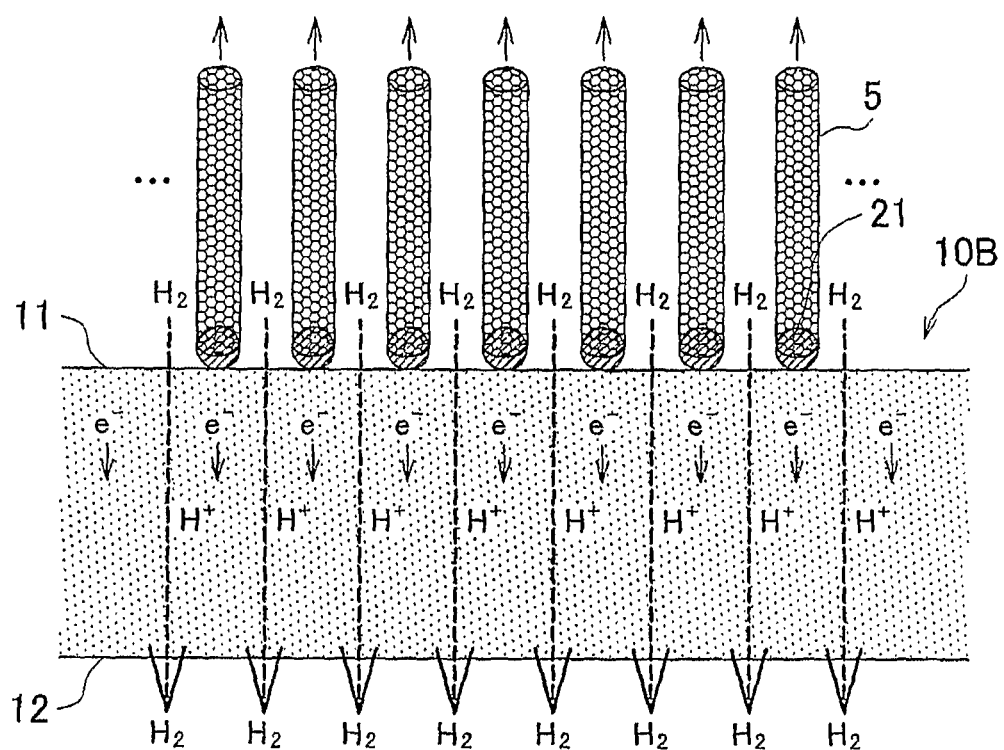

FIGS. 7A to 7C are schematic diagrams that explain a procedure for the production of carbon nanotubes as a third embodiment of the present invention. FIGS. 7A and 7B are generally the same as FIGS. 6A and 6B, respectively, except that a substrate 10B is shown in place of the substrate 10A with the first and second electrodes 31 and 32 thereon. The procedure for the production of carbon nanotubes of the third embodiment is the same as the production procedure of the second embodiment above except for the differences that are described below (FIG. 1).

The substrate 10B of the third embodiment is made of proton-electron mixed conductive ceramics that can conduct both protons and electrons. As the proton-electron mixed conductive ceramics, SrZrYNiO or BaCeYRuO can be used. With the substrate 10B, since the proton-electron mixed conductive ceramics is electron-conductive, hydrogen as a by-product can be transferred as protons through the substrate 10B to the second side 12 even when the first and second electrodes 31 and 32 (which are shown in FIG. 6B) that have the electrically conductive path 33 extending therebetween as described in the second embodiment are omitted. A protonating catalyst and a hydrogenating catalyst such as those in the second embodiment may be provided on the first and second sides 11 and 12, respectively, of the substrate 10B.

The substrate 10B may be formed as a composite film that is composed of proton conductive ceramics in which metal particles as an electrically conductive filler are mixed as described in the second embodiment instead of being made of proton-electron mixed conductive ceramics. More specifically, the substrate 10B may be produced by mixing Ni particles or Ni fibers with SrZrYO particles and sintering the mixture.

According to the production procedure of the third embodiment, the substrate 10B enables hydrogen to be transferred to the second side 12 thereof as protons as in the second embodiment. In addition, according to the substrate 10B, since the two mesh-type electrodes 31 and 32 as described in the second embodiment can be omitted, the probability that the growth of the carbon nanotubes 5 is inhibited by the first electrode 31 can be reduced. Therefore, a decrease in the raw material gas concentration on the first side 11 of the substrate 10B can be prevented, and formation of longer carbon nanotubes 5 can be achieved.

Figure 8A:
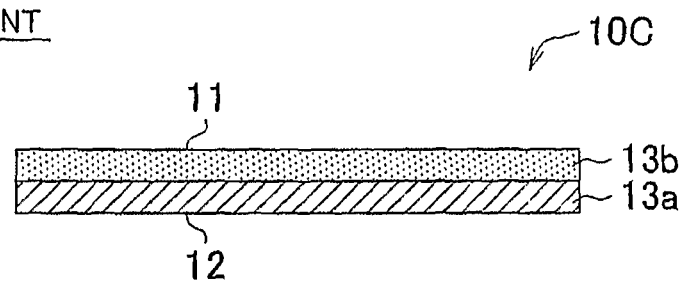
FIGS. 8A and 8B are schematic diagrams that explain a procedure for the production of carbon nanotubes according to a fourth embodiment.
Figure 8B:
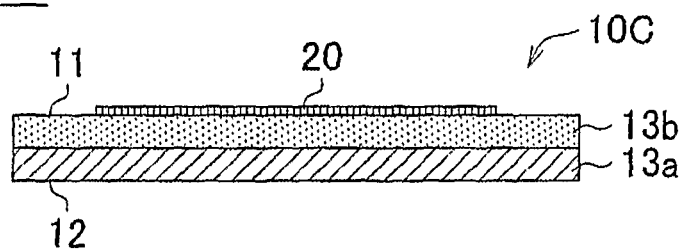

FIGS. 8A to 8C are schematic diagrams that explain a procedure for the production of carbon nanotubes as a fourth embodiment of the present invention. The procedure for the production of carbon nanotubes of the fourth embodiment is the same as the production procedure of the third embodiment above except for the differences that are described below (FIG. 1). In the first step, a thin film layer 13b of proton-electron mixed conductive ceramics (which is hereinafter referred to as "selectively hydrogen permeable film layer 13b") is formed on an outer surface of a support base 13a by sputtering to obtain a substrate 10C (FIG. 8A). The support base 13a is made of air permeable porous ceramics.

In the second step, the catalyst thin film 20 to support the catalyst particles 21 is formed on the outer surface of the substrate 10C on the side of the selectively hydrogen permeable film layer 13b by sputtering (FIG. 8B). A protonating catalyst, in addition to the catalyst particles 21, may be provided on the first side 11 of the substrate 10C as in the third embodiment. In addition, a hydrogenating catalyst may be provided on the support base 13a side of the selectively hydrogen permeable film layer 13b.

Figure 9A:
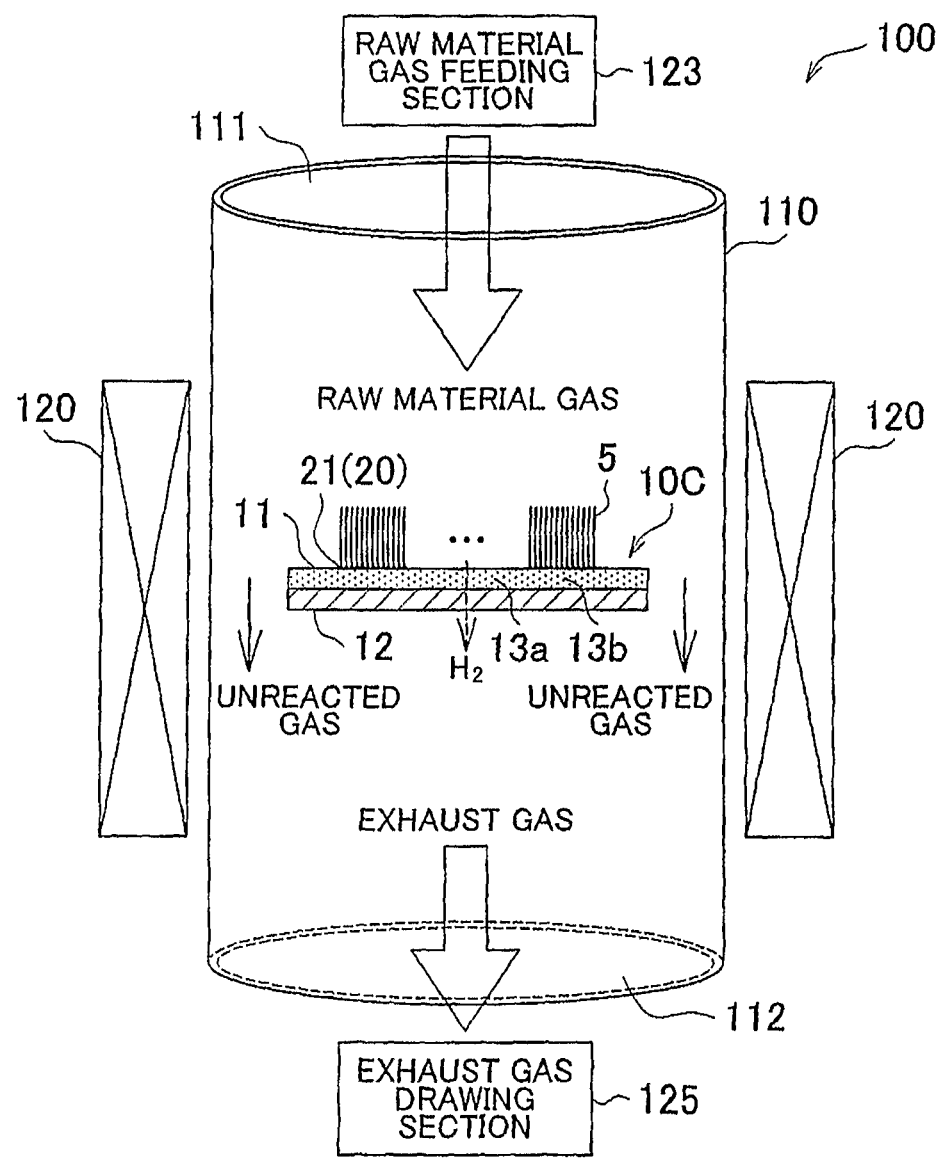
FIGS. 9A and 9B are schematic diagrams that explain a procedure for the production of carbon nanotubes according to the fourth embodiment.
Figure 9B:
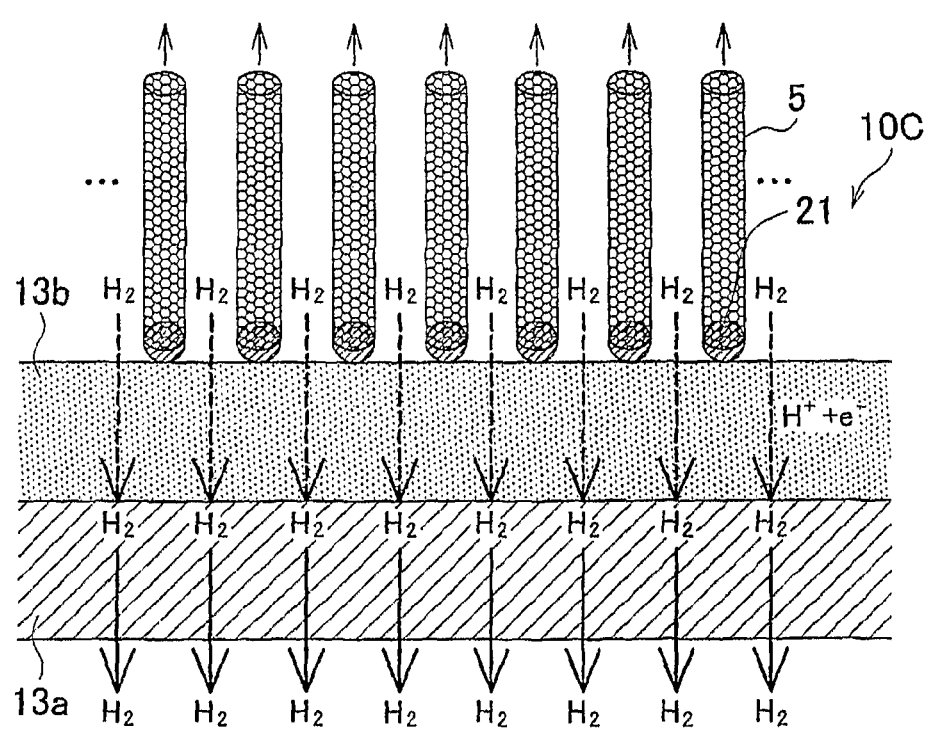

FIGS. 9A and 9B are schematic diagrams that explain a third step of the fourth embodiment. FIGS. 9A and 9B are generally the same as FIGS. 7A and 7B, respectively, except that the substrate 10C is shown in place of the substrate 10B. When the raw material gas is supplied and hydrogen is produced together with the carbon nanotubes 5, the selectively hydrogen permeable film layer 13b of the substrate 10C allows the hydrogen to be transferred toward the support base 13a as protons. The hydrogen that has been transferred to the support base 13a is discharged from the second opening 112 of the heating furnace 100 through the fine pores of the support base 13a.

Here, since the substrate 10C has the support base 13a, the selectively hydrogen permeable film layer 13b can be formed thinner as compared with the substrate 10B which has been described in the third embodiment, with the strength of the substrate 10C being maintained. Thus, the hydrogen permeation efficiency of the selectively hydrogen permeable film layer 13b can be improved. The selectively hydrogen permeable film layer 13b may be made of the same constitutional material as any of the substrates 10, 10A and 10B, which have been described in the first to third embodiments, instead of proton-electron mixed conductive ceramics. When the selectively hydrogen permeable film layer 13b is made of proton conductive ceramics that has relatively low electron conductivity, however, an electrically conductive path may be formed between the first and second sides 11 and 12 as in the case of the first and second electrodes 31 and 32, which have been described in the second embodiment.

As described above, according to the production procedure of the fourth embodiment, the selectively hydrogen permeable film layer 13b of the substrate 10C can be made thinner so that the hydrogen permeation efficiency thereof can be improved. Therefore, a decrease in the raw material gas concentration can be further prevented and formation of longer carbon nanotubes 5 can be achieved.

Figure 10A:
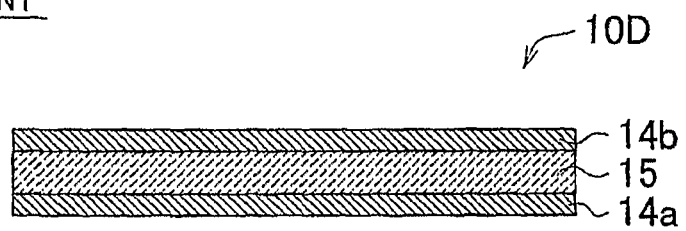
FIGS. 10A and 10B are schematic diagrams that explain a procedure for the production of carbon nanotubes according to a fifth embodiment.
Figure 10B:
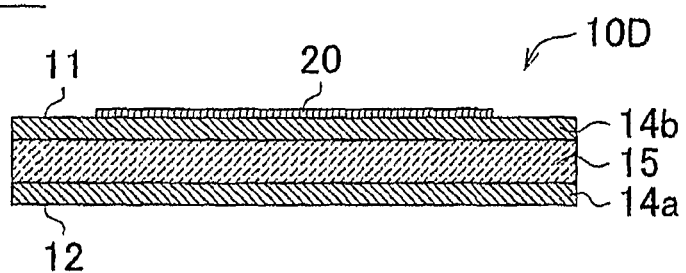

FIGS. 10A to 10C are schematic diagrams that explain a procedure for the production of carbon nanotubes as a fifth embodiment of the present invention. The procedure for the production of carbon nanotubes of the fifth embodiment is the same as the production procedure of the fourth embodiment above except the differences that are described below (FIG. 1). In the first step, a substrate 10D is prepared (FIG. 10A). Specifically, a polymer electrolyte layer 15 is formed on an outer surface of a thin film layer 14a of a hydrogen permeable metal (which is hereinafter referred to as "cathode electrode layer 14a") by sputtering. In addition, a thin film layer 14b of a hydrogen permeable metal (which is hereinafter referred to as "anode electrode layer 14b") is formed on an outer surface of the polymer electrolyte layer 15. As the hydrogen permeable metal to form the two electrode layers 14a and 14b, palladium or a palladium alloy may be used. The polymer electrolyte layer 15 is made of a proton conductive polymer electrolyte. Specifically, the polymer electrolyte layer 15 can be made of $SrZrInO_3$, for example. In the second step, a catalyst thin film 20 is formed on an outer surface of the anode electrode layer 14b by sputtering (FIG. 10B).

Figure 11A:
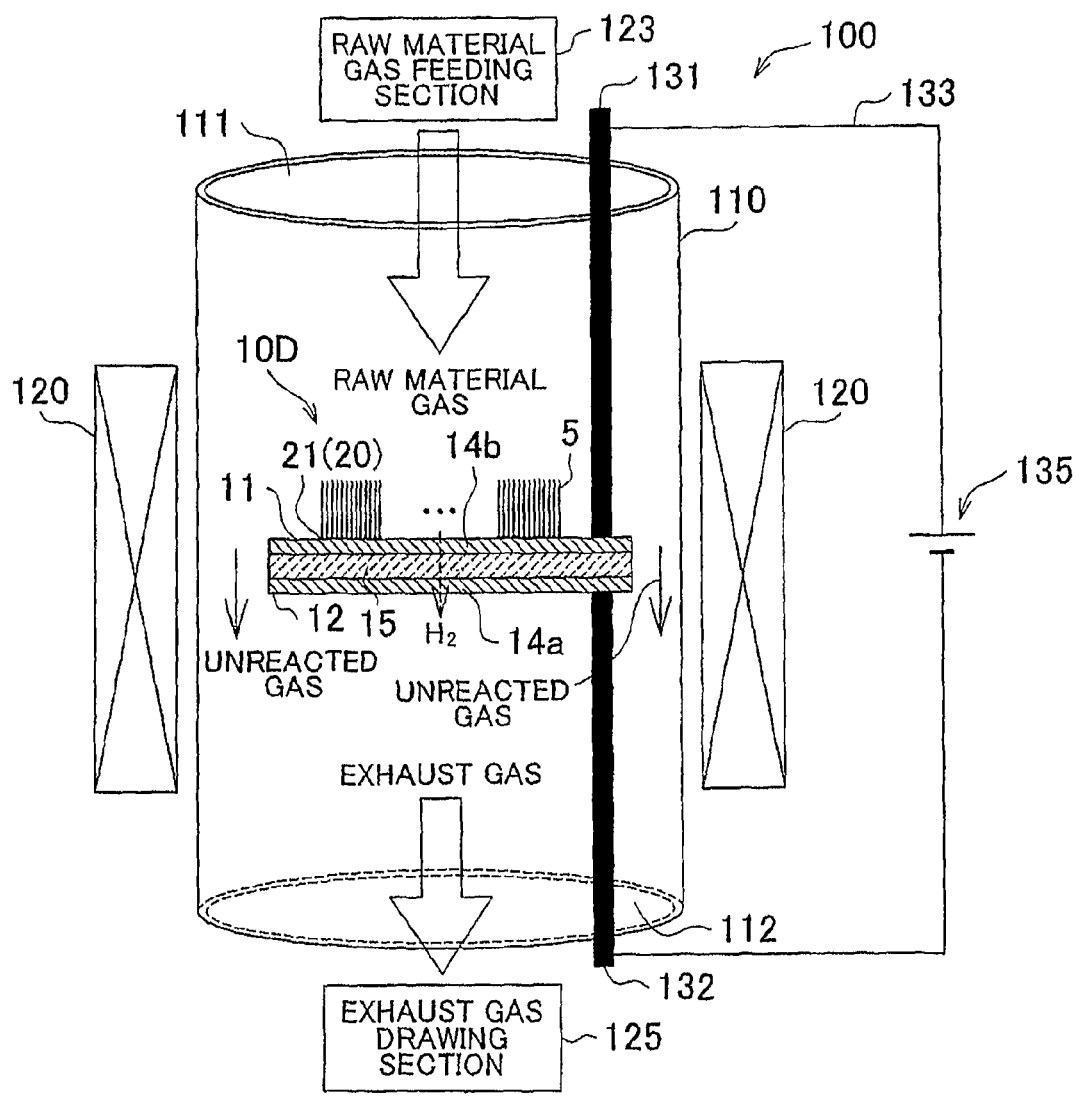
FIGS. 11A and 11B are schematic diagrams that explain a procedure for the production of carbon nanotubes according to the fifth embodiment.
Figure 11B:
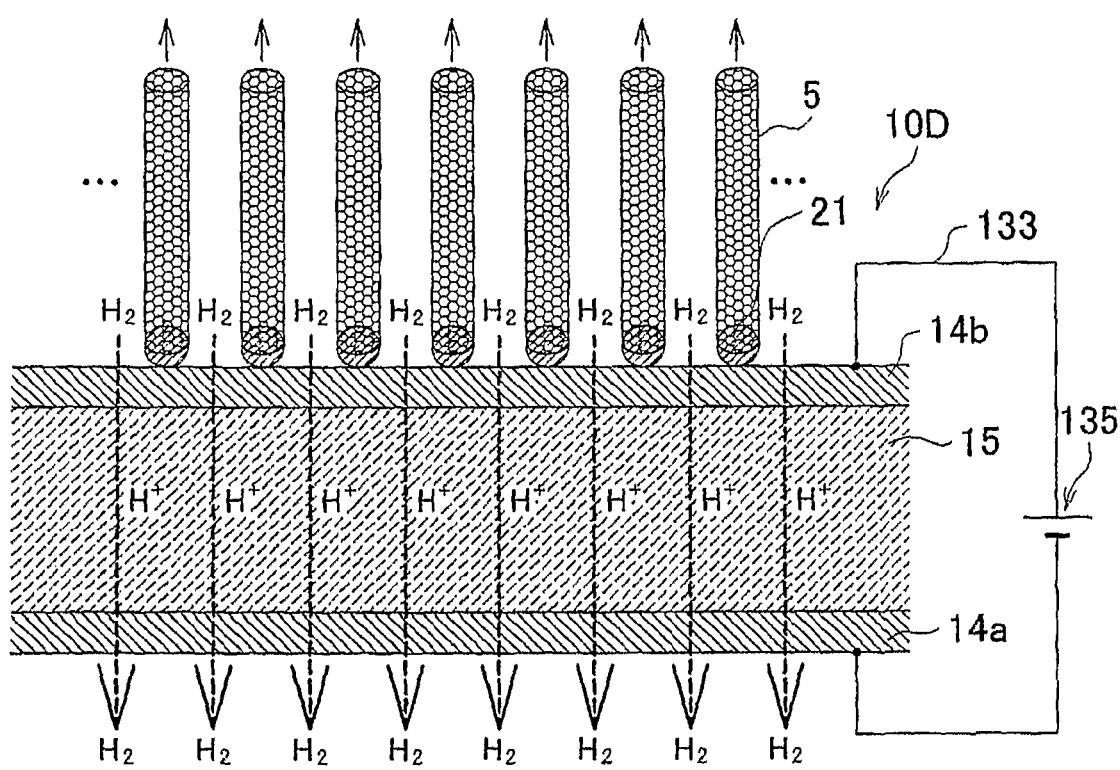

FIGS. 11A and 11B are schematic diagrams that explain third and fourth steps of the fifth embodiment. FIGS. 11A and 11B are generally the same as FIGS. 9A and 9B, respectively, except that the substrate 10D is shown in place of the substrate 10C and that two electrode terminals 131 and 132, a DC power source line 133, and a DC power source 135 are additionally provided. In FIG. 11B, illustration of the two electrode terminals 131 and 132 is omitted for convenience sake, and the fact that the two electrode layers 14a and 141, of the substrate 10D are electrically connected to the DC power source 135 via the DC power source line 133 is schematically illustrated.

In the third step, the substrate 10D is placed in the interior space of the furnace tubing 110. Also, the first and second electrode terminals 131 and 132 are inserted into the interior space of the furnace tubing 110 from the openings 111 and 112, respectively, and brought into contact with the anode electrode layer 14b and the cathode electrode layer 14a, respectively, of the substrate 10D. The two electrode terminals 131 and 132 are connected to the DC power source 135 via the DC power source line 133. The two electrode terminals 131 and 132 are made of a metal that has a sufficiently high melting point to withstand the temperature rise in the heating furnace 100 (for example, tungsten).

In the fourth step, feeding of the raw material gas to the first side 11 of the substrate 10D is started while maintaining the temperature of the interior space of the furnace tubing 110 at an elevated temperature by the heater section 120. At this time, a potential difference of approximately 0.1 V is applied between the first and second sides 11 and 12 of the substrate 10D by the DC power source 135. Then, the carbon nanotubes 5 are formed on the first side 11, and the hydrogen that is formed with formation of the carbon nanotubes 5 is transferred from the first side 11 to the second side 12 as protons by the potential difference that is applied by the DC power source 135.

As described above, according to the production process of the fifth embodiment, hydrogen as a by-product can be separated from the raw material gas and transferred to the second side 12 by applying a potential difference between the first and second sides 11 and 12 of the substrate 10D. Therefore, the hydrogen concentration in the reaction sites can be efficiently reduced and longer carbon nanotubes 5 can be formed.

Figure 12A:
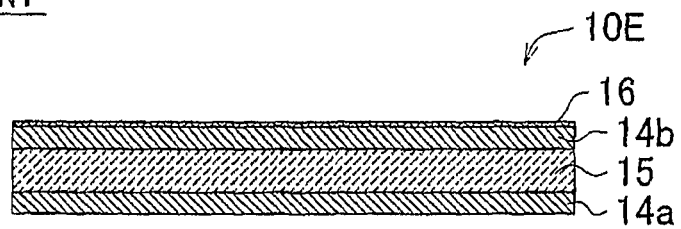
FIGS. 12A, 12B and 12C are schematic diagrams that explain a procedure for the production of carbon nanotubes according to a sixth embodiment.
Figure 12B:
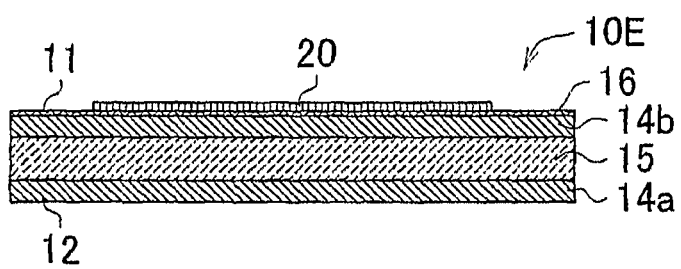

FIGS. 12A and 12B are schematic diagrams that explain first and second steps of the procedure for the production of carbon nanotubes as a sixth embodiment of the present invention. FIGS. 12A and 12B are generally the same as FIGS. 10A and 10B, respectively, except that an intermediate layer 16 is provided on a surface of the anode electrode layer 14b. In other words, in the first step of this sixth embodiment, the two electrode layers 14a and 14b and the polymer electrolyte layer 15 are formed as in the fifth embodiment, and, then an intermediate layer 16 is formed on an outer surface of the anode electrode layer 14b by sputtering (FIG. 12A). The intermediate layer 16 is made of porous ceramics such as aluminum oxide or titanium dioxide ($TiO_2$: which is also called "titania"). In the second step, the catalyst thin film 20 is formed by sputtering on an outer surface of the intermediate layer 16 of a substrate 10E that has been prepared in the first step. It should be noted that the steps after the preparation of the substrate 10E (steps S30 and S40 in FIG. 1) are the same as those of the fifth embodiment, and therefore their illustration and description are not repeated.

Figure 12C:
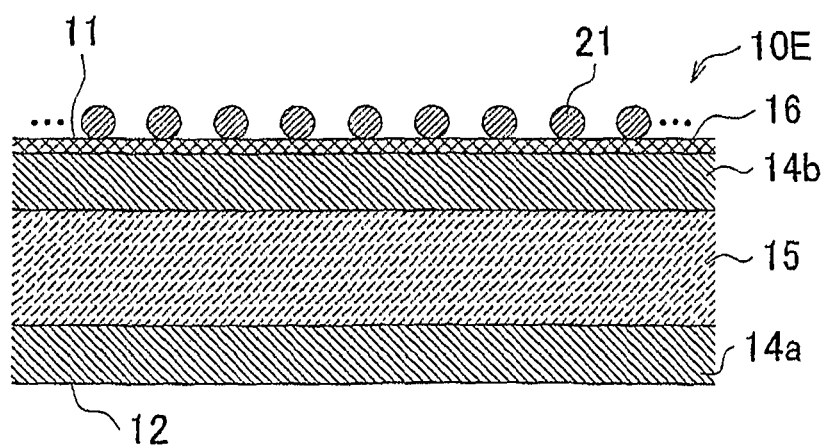

FIG. 12C is a schematic diagram that illustrates a part of the substrate 10E after the conversion of the catalyst metal that forms the catalyst thin film 20 into particles in an enlarged scale. Here, catalyst metals, in general, tend to be alloyed with another metal or oxide ceramics. With the substrate 10E, however, since the intermediate layer 16 is provided between the catalyst particles 21 and the anode electrode layer 14b, the catalyst particles 21 is prevented from being diffused and alloyed in the anode electrode layer 14b even when heated in the heating furnace 100. In other words, the intermediate layer 16 serves as a diffusion preventive layer for the catalyst particles 21. Therefore, the intermediate layer 16 reduces the probability that the catalyst particles 21 are deactivated and promotes formation of the carbon nanotubes 5. Since the intermediate layer 16 is porous, it allows hydrogen as a by-product to permeate therethrough.

Figure 13:
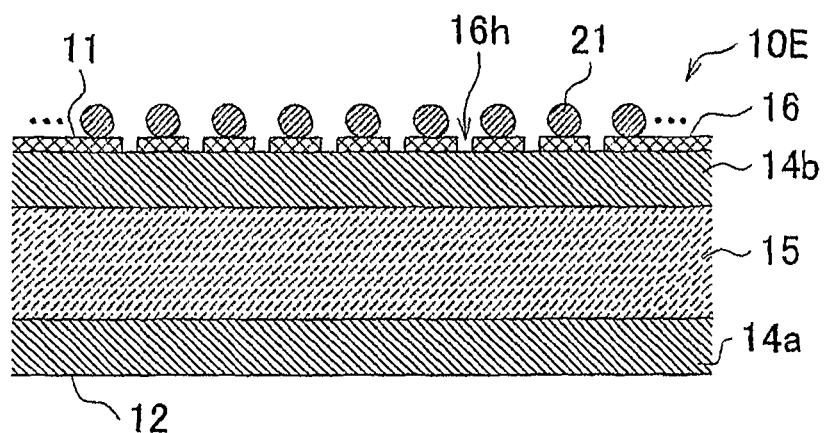
FIG. 13 is a schematic diagram that explain another constitution example of an intermediate layer of the sixth embodiment.

FIG. 13 is a schematic diagram that explains an intermediate layer 16 as a second constitution example of the sixth embodiment. FIG. 13 is generally the same as FIG. 12C except that the intermediate layer 16a has a plurality of through-holes 16h.

The intermediate layer 16a is formed not as a porous thin film layer but as a relatively dense thin film layer. In his case, since the hydrogen permeation rate may decrease, the intermediate layer 16a has through-holes 16 that are formed by etching between the catalyst particles 21 that are supported thereon. The through-holes 16h may be formed either before or after the catalyst metal is provided on an outer surface of the intermediate layer 16a.

As described above, according to the production process of the sixth embodiment, the intermediate layer 16 or 16a can prevent deactivation of the catalyst particles 21 and promote the growth of the carbon nanotubes 5. Therefore, the formable limit length of carbon nanotubes can be increased. The intermediate layer 16 or 16a may be provided between any of the substrates 10, 10A, 10B and 10C that have been described in the first to fourth embodiments and the catalyst metal.

Figure 14:
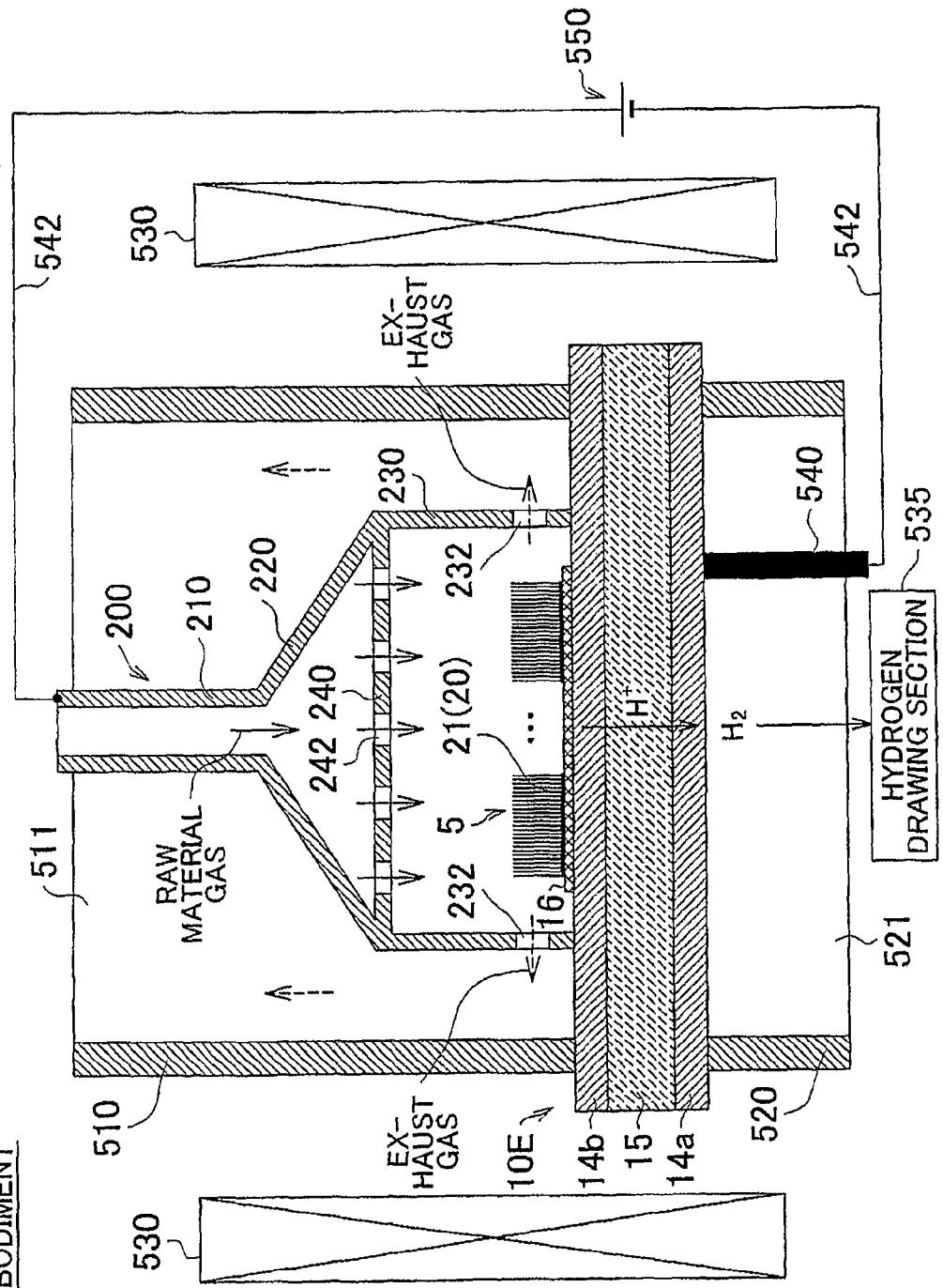
FIG. 14 is a schematic view that illustrates a carbon nanotube production apparatus according to a seventh embodiment.

FIG. 14 is a schematic cross-sectional view that illustrates the configuration of a carbon nanotube production apparatus as a seventh embodiment of the present invention. The carbon nanotube production apparatus 500 is an apparatus for the formation of carbon nanotubes by CVD method. The carbon nanotube production apparatus 500 has a substrate 10E, a raw material gas inducing member 200, first and second furnace tubings 510 and 520, a heater section 530, a hydrogen drawing section 535, an electrode terminal 540, and a DC power source 550. The substrate 10E is the same as the substrate that has been described in the sixth embodiment, whereas the intermediate layer 16 is provided only in the area where the catalyst thin film 20 is formed. The intermediate layer 16 may be omitted.

The catalyst thin film 20 is formed on an outer surface of the intermediate layer 16 of the substrate 10E by sputtering. The catalyst metal that forms the catalyst thin film 20 is converted into particles and dispersed on the substrate 10E as catalyst particles 21 when heated after the substrate 10E has been placed in the carbon nanotube production apparatus 500. The catalyst metal may be reduced with hydrogen prior to the formation of carbon nanotubes.

The first and second furnace tubings 510 and 520 are hollow cylindrical members that have almost the same diameter. The first furnace tubing 510 is located on the side of the first side 11 of the substrate 10E, and the second furnace tubing 520 is located on the side of the second side 12 of the substrate 10E. The outer peripheral edge of the substrate 10E is sandwiched between the two furnace tubings 510 and 520. The raw material gas inducing member 200 is accommodated in the first furnace tubing 510. The raw material gas inducing member 200 is described later. The heater section 530 is located around the two furnace tubings 510 and 520 to increase the temperature of the interior spaces of the two furnace tubings 510 and 520. The hydrogen drawing section 535 has a suction pump (not shown), and can reduce the gas pressure in the interior space of the second furnace tubing 520. The electrode terminal 540, which is inserted in the second furnace tubing 520 and connected to the cathode electrode layer 14a of the substrate 10E, is connected to the DC power source 550 via a DC power source line 542. While the carbon nanotube production apparatus 500 is provided with a raw material gas feeding section that is similar to the raw material gas feeding section 123 that has been described in the first to sixth embodiments, its illustration is omitted.

Figure 15A:
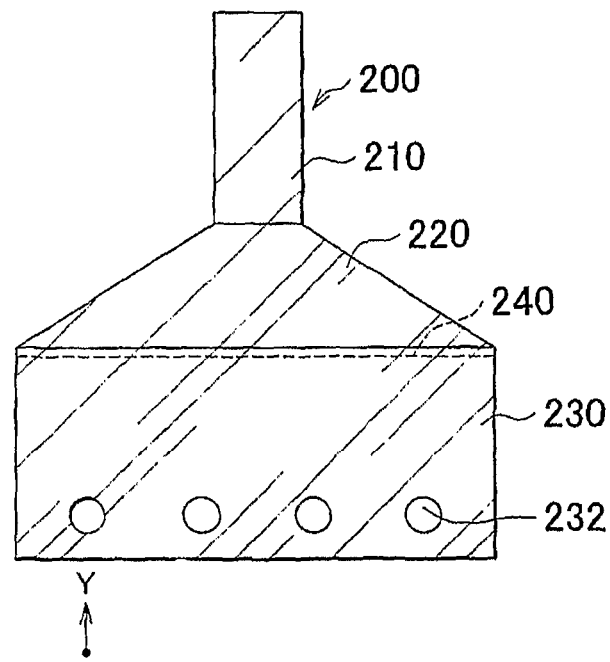
FIGS. 15A and 15B are schematic views that illustrate a raw material gas inducing member of the seventh embodiment.
Figure 15B:
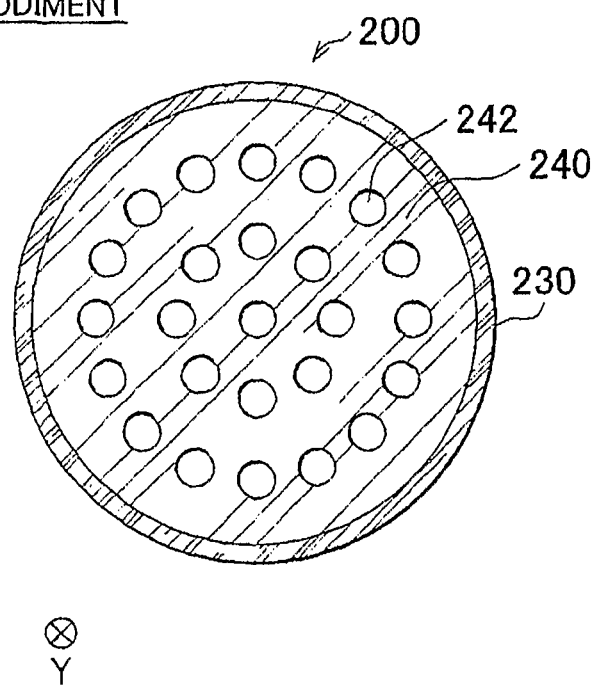

FIGS. 15A and 15B are schematic views that illustrate the configuration of the raw material gas inducing member 200. FIG. 15A is a view of the raw material gas inducing member 200 that is seen from a side thereof, and FIG. 15B is a view of the raw material gas inducing member 200 that is seen from the bottom side thereof (in the direction of the arrow Y in FIG. 15A).

The raw material gas inducing member 200 has an upstream cylindrical portion 210 with a relatively small diameter; a taper portion 220 that is connected to the upstream cylindrical portion 210 and increases in diameter downwardly; and a downstream cylindrical portion 230 that is connected to the taper portion 220 and has a diameter that is greater than that of the upstream cylindrical portion 210. A shower plate 240 that has a plurality of through-holes 242 is provided between the taper portion 220 and the downstream cylindrical portion 230. A plurality of through-holes 232 are provided in a line through the side wall of a lower end portion of the downstream cylindrical portion 230 along the entire circumference thereof.

In the carbon nanotube production apparatus 500, the raw material gas inducing member 200 is located such that the anode electrode layer 14b of the substrate 10E and the lower end of the downstream cylindrical portion 230 are in contact with each other, and the catalyst thin film 20 that is formed on the substrate 10E is accommodated in the downstream cylindrical portion 230 (FIG. 14). In other words, the catalyst thin film 20 is surrounded by the side wall of the downstream cylindrical portion 230.

The raw material gas inducing member 200 is made of an electrically conductive material, and is connected to the DC power source 550 via the DC power source line 542. The DC power source 550 can apply a potential difference of approximately 0.1 V between the first and second sides 11 and 12 of the substrate 10E via the raw material gas inducing member 200 and the electrode terminal 540. In other words, the raw material gas inducing member 200 also serves to function as a terminal of the anode electrode layer 14b.

Here, the flow of gases in the carbon nanotube production apparatus 500 is indicated by solid line arrows and broken line arrows in FIG. 14. In the carbon nanotube production apparatus 500; the interior spaces of the two furnace tubings 510 and 520 have been heated to approximately 800° C. by the heater section 530, and then a raw material gas is supplied through the upstream cylindrical portion 210 of the raw material gas inducing member 200. The raw material gas from the taper portion 220 is uniformly diffused radially by the shower plate 240, and fed toward the catalyst particles 21 in the downstream cylindrical portion 230. Then, carbon nanotubes 5 are formed in the catalyst supporting area on the first side 11 of the substrate 10E. At this time, hydrogen that is produced as a by-product is induced to the second side 12 by the potential difference that is applied between the first and second sides 11 and 12 by the DC power source 550.

On the other hand, an exhaust gas that contains unreacted gas which is a portion of the raw material gas that has not undergone the reaction that results in the formation of the carbon nanotubes 5 is discharged to the outside of the raw material gas inducing member 200 through the through-holes 232 formed through the side wall of the downstream cylindrical portion 230 (broken line arrows). The exhaust gas that has been discharged, to the outside of the raw material gas inducing member 200 flows upward in the first furnace tubing 510, and is discharged to outside through an opening 511 of the first furnace tubing 510. The hydrogen that has been transferred to the second side 12 of the substrate 10E is drawn by the hydrogen drawing section 535 and discharged through an opening 521 of the second furnace tubing 520. Here, in the carbon nanotube production apparatus 500, the interior spaces of the first and second furnace tubings 510 and 520 are partitioned and separated by the substrate 10E. In the carbon nanotube production apparatus 500, therefore, the hydrogen drawing operation of the hydrogen drawing section 535 can create a large difference between the hydrogen partial pressure on the side of the first side 11 of the substrate 10E and that on the side of the second side 12 of the substrate 10E to promote the transfer of hydrogen through the substrate 10E.

As described above, in the carbon nanotube production apparatus 500, the substrate 10E enables hydrogen as a by-product to be separated from the raw material gas and discharged to the outside of the reaction sites. Thus, a decrease in the raw material gas concentration in the reaction sites can be prevented, and formation of the carbon nanotubes 5 can be promoted. In addition, the raw material gas inducing member 200 can increase the supply flow of the raw material gas to the reaction sites, and increase the discharge of the exhaust gas from the reaction sites. Thus, the formation of the carbon nanotubes 5 is further promoted. Moreover, the current collection efficiency of the anode electrode layer 14b can be improved by making the raw material gas inducing member 200 function as a terminal of the anode electrode layer 14b.

FIG. 16 is a schematic cross-sectional view that illustrates the configuration of a carbon nanotube production apparatus 500A as an eighth embodiment of the present invention. FIG. 16 is generally the same as FIG. 14 except that an oxidizing gas supplying section 560 is added in place of the hydrogen removing section 535 and that a heater power source section 555 is shown in place of the DC power source 550. In the carbon nanotube production apparatus 500A, oxygen as an oxidizing gas is supplied from the oxidizing gas supplying section 560 to the second side 12 of the substrate 10E through the opening 521 of the second furnace tubing 520 when the carbon nanotubes 5 are formed. Thus, the hydrogen that has been transferred to the second side 12 through the substrate 10E reacts with the supplied oxygen to form water. At this time, the electrical power that is generated in the substrate 10E by the electrochemical reaction is supplied to the heater power source section 555 via the DC power source line 542. The heater power source section 555 is an electrical power source for the heater section 530. In other words, the electrical power generated in the substrate 10E is used as part of the energy source for the heating operation of the heater section 530. In addition, the formation of the carbon nanotubes 5 is promoted by the heat that is generated during the power generation in the substrate 10E.

As described above; in the carbon nanotube production apparatus 500A, the hydrogen that is produced with formation of the carbon nanotubes 5 is used as a reaction gas to make the substrate 10E function as a polymer electrolyte fuel cell. In addition, the electrical power that is generated in the substrate 10E is used for the formation of the carbon nanotubes 5. Therefore, the efficiency of formation of the carbon nanotubes 5 can be, improved.

Figure 17:
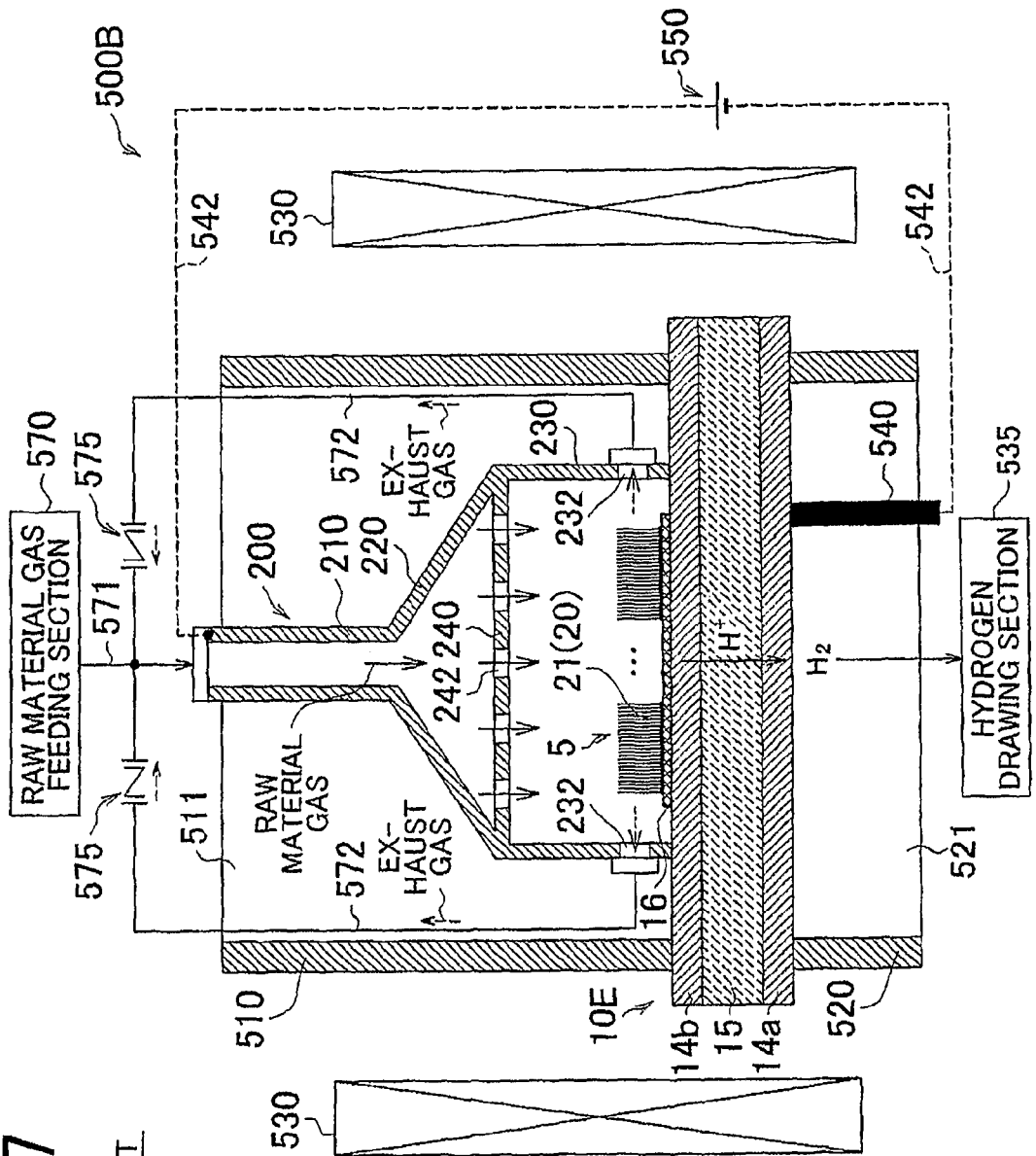
FIG. 17 is a schematic view that illustrates a carbon nanotube production apparatus according to a ninth embodiment.

FIG. 17 is a schematic cross-sectional view that illustrates the configuration of a carbon nanotube production apparatus 500B as a ninth embodiment of the present invention. FIG. 17 is generally the same as FIG. 14 except that illustration of a raw material gas feeding section 570 is added and that pipes 571 and 572 that are connected to the raw material gas inducing member 200 and check valves 575 that are provided in the pipes 572 are added. For convenience sake, the DC power source line 542 is shown by broken lines to distinguish it from the pipes 571 and 572 in FIG. 17.

The raw material gas feeding section 570 is connected to the upstream cylindrical portion 210 of the raw material gas inducing member 200 via the supply pipe 571. Thus, the raw material gas is supplied from the raw material gas feeding section 570 to the raw material gas inducing member 200. The through-holes 232 for exhaust gas formed through the raw material gas inducing member 200 are connected to the supply pipe 571 via the circulation pipes 572. Each of the circulation pipes 572 is provided therein with a check valve 575 to prevent reverse flow of the raw material gas from the supply pipe 571.

With this configuration, in the carbon nanotube production apparatus 500B, the unreacted gas that has not undergone the forming reaction of the carbon nanotubes 5 can be supplied again as a part of the raw material gas through the upstream cylindrical portion 210. While hydrogen as a by-product of the reaction to form the carbon nanotubes 5 is separated from the exhaust gas by the substrate 10E, there is a possibility that the exhaust gas may still contain impurities such as hydrogen and by-products other than hydrogen. The circulation pipe 572 may be provided therein with a filter in order to remove such impurities.

As described above, according to the carbon nanotube production apparatus 500B of the ninth embodiment, the unreacted gas that has not undergone the forming reaction of the carbon nanotube can be recycled as raw material gas. Therefore, the efficiency of formation of the carbon nanotubes 5 can be improved.

FIG. 18 is a schematic cross-sectional view that illustrates the configuration of a carbon nanotube production apparatus 500C as a tenth embodiment of the present invention. FIG. 18 is generally the same as FIG. 16 except that a substrate 10F is shown in place of the substrate 10E and that the electrode terminal 540 and the DC power source line 542 are omitted. The substrate 10F can be formed of a thin plate of a metal, such as palladium, that selectively allows hydrogen to permeate therethrough.

In the carbon nanotube production apparatus 500C, the hydrogen that has permeated from the first side 11 of the substrate 10F can be combusted on the second side 12, and the heat generated by the combustion can be used for the reaction to form the carbon nanotube 5 that is an endothermic reaction. Thus, the amount of heat that is applied by the heater section 530 can be reduced by the amount of heat that is generated by the combustion, and the efficiency of formation of the carbon nanotubes 5 can be improved. In addition, in the carbon nanotube production apparatus 500C, the members to collect current from the substrate 10F such as the electrode terminal 540 and the DC power source line 542, which have been described in the eighth embodiment, can be omitted.

This invention is not limited to the above embodiments, and may be modified as described below.

In the first to sixth embodiments, the exhaust gas drawing section 125 is provided on the side of the second opening 112 in the furnace tubing 110 of the heating furnace 100. Also, in the seventh and ninth embodiments, the hydrogen drawing section 535 is provided on the side of the second furnace tubing 520. As a modification of these embodiments, a purge section that purges the exhaust gas on the second side 12 with an inert gas may be provided instead of the exhaust gas drawing section 125 or the hydrogen drawing section 535. Even with this configuration, the hydrogen on the first side 11 can be induced to the second side 12 since the hydrogen partial pressure on the side of the second side 12 can be locally reduced by the inert gas from the purge section.

The exhaust gas drawing section 125, the hydrogen drawing section 535, or the purge section may be omitted. Even with this configuration, when the hydrogen concentration increases in the reaction sites, the hydrogen is transferred from the first side 11 to the second side 12 according to the concentration gradient. However, when the exhaust gas drawing section 125, the hydrogen removing section 535, or the purge section is provided, a greater amount of hydrogen can be efficiently induced to the second side 12.

As a modification of the above first to sixth embodiments, raw material gas may be separated from the exhaust gas that has been discharged from the second opening 112 of the furnace tubing 110 with a hydrogen separation membrane or the like and recycled for the formation of carbon nanotubes as in the ninth embodiment.

As a modification of the above fourth or fifth embodiment, the oxidizing gas supplying section 560 as described in the eighth embodiment may be provided instead of the exhaust gas drawing section 125, and the DC power source line 133 may be connected, instead of the DC power source 135, to a load. With this configuration, electric power can be generated in the substrate 10D or 10E as in the eighth embodiment.

In the above seventh embodiment, the carbon nanotube production apparatus 500 is provided with the substrate 10E.

As a second modification of this embodiment, the carbon nanotube production apparatus 500 may be provided, instead of the substrate 10E, with any of the substrates 10, 10A, 10B, 10C and 10D, which have been described in the first to fifth embodiments, respectively. In this case, the DC power source 550, the electrode terminal 540, and the DC power source line 542 may be omitted.

While the raw material gas inducing member 200 is made of an electrically conductive material in the above seventh to ninth embodiments, the raw material gas inducing member 200 may be made of a non-electrically conductive material as a modification of these embodiments. In this case, an electrode terminal for the anode electrode layer 14b may be additionally provided. In addition, the raw material gas inducing member 200 may not have the upstream cylindrical portion 210, the taper portion 220, and the shower plate 240. However, when the shower plate 240 is provided, the diffusion of the raw material gas can be improved.

in the above eighth embodiment, the electrical power that is generated in the substrate 10E by removal of hydrogen is supplied to the heater section 530. As a modification of this embodiment, the electrical power may be supplied to another component of the carbon nanotube production apparatus 500A. The electrical power may be supplied to an external load that is connected to the carbon nanotube production apparatus 500A.

The present invention may be embodied in various forms. For example, the present invention can be implemented in the form of a process and apparatus for the production of carbon nanotubes, a computer program that realizes the function of the production process or production apparatus, a recording medium in which the computer program is stored, and so on.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A carbon nanotube production apparatus by a chemical vapor deposition method, comprising:
    a reactor that accommodates a substrate;
    the substrate comprising a first side and a second side; a first hydrogen permeable electrode layer provided on the first side; a second hydrogen permeable electrode layer provided on the second side; a polymer electrolyte layer having proton conductivity interposed between the first and second hydrogen permeable electrode layers; and a catalyst that promotes a forming reaction of a carbon nanotube supported on the first side, the substrate having the first hydrogen permeable electrode layer interposed between the catalyst and the polymer electrolyte layer, the substrate being configured to allow hydrogen to permeate therethrough from the first side to the second side;
    a raw material gas feeding section that feeds a raw material gas that contains carbon atoms and hydrogen atoms to the first side;
    an oxidizing gas supply section the supplies an oxygen-containing gas to the second side and is configured to subject the hydrogen that is produced by the forming reaction of the carbon nanotube on the first side and has permeated from the first side to the second side to an electrochemical reaction with the oxidizing gas so that the hydrogen that is produced by the forming reaction of the carbon nanotube;
    a heater section that is configured to heat the reactor; and
    a heater power source section that is an electrical power source for the heater section, electrically connected between the first and second hydrogen permeable electrode layers configured to collect an electrical power that is generated by the electrochemical reaction to supply part of an electrical power that is supplied to the heater power source section.

2. The production apparatus according to claim 1, further comprising a raw material gas inducing member that induces the raw material gas to the first side of the substrate, wherein the raw material gas inducing member has an outer peripheral side wall that surrounds a catalytic region in the first side on which the catalyst is supported such that the raw material gas is induced to the catalytic region, and
    the outer peripheral side wall is provided with a discharge hole through which an unreacted raw material gas is discharged to outside, the unreacted raw material gas being a portion of the raw material gas that has been induced to the catalytic region but that has not undergone the forming reaction of the carbon nanotube.

3. The production apparatus according to claim 1, wherein the substrate is configured to allow hydrogen to selectively permeate therethrough, and the hydrogen that is produced on the first side is selectively permeated to the second side, to be removed from the first side.

4. The production apparatus according to claim 1, wherein the permeated hydrogen is in the form of protons.

\* \* \* \* \*